United States Patent
Kim et al.

(10) Patent No.: US 11,073,723 B2
(45) Date of Patent: Jul. 27, 2021

(54) BACKLIGHT UNIT AND DISPLAY DEVICE HAVING THE SAME

(71) Applicant: Samsung Display Co., LTD., Yongin-si (KR)

(72) Inventors: Tae Gyun Kim, Seoul (KR); Yong Doo Park, Cheonan-si (KR); Bum Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/845,871

(22) Filed: Apr. 10, 2020

(65) Prior Publication Data
US 2021/0003888 A1 Jan. 7, 2021

(30) Foreign Application Priority Data

Jul. 1, 2019 (KR) .................. 10-2019-0078611

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133614* (2021.01)

(58) Field of Classification Search
CPC ......... G02F 1/133605; G02F 1/133603; G02F 1/133606; G02F 1/133602; G02F 1/133609; G02F 2001/133614; F21K 9/64; F21V 9/30
See application file for complete search history.

(56) References Cited

U.S. PATENT DOCUMENTS

| | | | |
|---|---|---|---|
| 8,469,530 B2 * | 6/2013 | Ito | G02F 1/133603 362/84 |
| 9,423,554 B2 * | 8/2016 | Ohkawa | G02B 6/0023 |
| 10,338,433 B2 * | 7/2019 | Kurita | G02F 1/133606 |
| 2017/0102586 A1 * | 4/2017 | Kim | G02F 1/133603 |
| 2018/0364408 A1 * | 12/2018 | Hwang | G02F 1/133504 |
| 2019/0113208 A1 * | 4/2019 | Chan | G02F 1/133617 |
| 2020/0183230 A1 * | 6/2020 | Ryu | G02F 1/133512 |

FOREIGN PATENT DOCUMENTS

| | | |
|---|---|---|
| KR | 10-2017-0052729 | 5/2017 |
| KR | 10-2017-0116735 | 10/2017 |
| KR | 10-2018-0071045 | 6/2018 |
| KR | 10-2018-0072798 | 6/2018 |
| KR | 10-2018-0130765 | 12/2018 |

* cited by examiner

*Primary Examiner* — Peggy A Neils
(74) *Attorney, Agent, or Firm* — Kile Park Reed & Houtteman PLLC

(57) ABSTRACT

A backlight unit, and a display device including the backlight unit are provided. The backlight unit includes a light source member including a first substrate; and a plurality of light sources disposed on a surface of the first substrate, and a wavelength conversion member disposed on over of the light source member to overlap the light source member, the wavelength conversion member including a second substrate and a plurality of wavelength conversion patterns disposed on a surface of the second substrate, wherein the plurality of wavelength conversion patterns are disposed to be spaced apart from one another, and each of the plurality of wavelength conversion patterns covers at least one of the plurality of light sources.

22 Claims, 28 Drawing Sheets

200_2: 210, 220, 230, 240

220_3: 210, 220, 230, BM

200_4: 210, 220_4, 230, BM

200_7: 210, 220_4, 230, BM

200_8: 210, 220_5, 230, 240, BM

120: 121, 122, 123, 124, 125, 126, 127, 128, 129
110A: 110a, 110b, 110c
110a: 111, 112, 113, 114

US 11,073,723 B2

BACKLIGHT UNIT AND DISPLAY DEVICE HAVING THE SAME

CROSS-REFERENCE TO RELATED APPLICATION

This application claims priority to and benefits of Korean Patent Application No. 10-2019-0078611 under 35 U.S.C. § 119, filed in the Korean Intellectual Property Office on Jul. 1, 2019, the entire contents of which are incorporated herein by reference.

BACKGROUND

1. Technical Field

The disclosure relates to a backlight unit and a display device having the same.

2. Description of the Related Art

A liquid crystal display receives light from a backlight unit and displays an image. The backlight unit may include light sources. Light emitted from the light sources is incident on a liquid crystal display panel through an optical film or the like.

In recent years, the application of a wavelength conversion film to improve image quality such as color reproducibility of a liquid crystal display has been studied. A blue light source may commonly be used as a light source, and a wavelength conversion film may be disposed on a light path to allow for conversion into white light.

In the case of an edge-type backlight unit in which a light source is located on a side portion of a display panel, a wavelength conversion film may be disposed on an upper portion of a light guide plate. On the other hand, in the case of a direct-type backlight unit in which a light source is disposed under a display panel, a wavelength conversion film may directly face the light source. As a thickness of a liquid crystal display is reduced, a distance between the light source and the wavelength conversion film shortens. The light source may serve as a heat source and when a wavelength conversion film adjacent thereto is exposed to heat, the wavelength conversion film may be deformed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An aspect of the disclosure may provide a backlight unit allowing for a reduction in the material cost of a wavelength conversion material and/or allowing for the prevention of thermal deformation of a wavelength conversion layer.

Another aspect of the disclosure may provide a display device having a backlight unit allowing for a reduction in the material cost of a wavelength conversion material and/or allowing for the prevention of thermal deformation of a wavelength conversion layer.

However, aspects of the disclosure are not restricted to the ones set forth herein. The above and other aspects of the disclosure will become more apparent to one of ordinary skill in the art to which the disclosure pertains by referencing the detailed description given below.

According to an embodiment of the disclosure, the cost of materials may be reduced by selectively patterning the wavelength conversion layer of a wavelength conversion member only in a necessary region thereof. Light efficiency may be increased by making a path of light emitted from the light source to be directed toward the patterned wavelength conversion layer, with the use of a reflective barrier.

According to an embodiment of the disclosure, a glass substrate may be used as the substrate of the wavelength conversion member, whereby thermal deformation may be minimized.

Effects according to the embodiments are not limited by the contents exemplified above, and more various effects are included in the specification as may be known and appreciated by one of ordinary skill in the art.

According to an embodiment of the disclosure, a backlight unit comprises a light source member including a first substrate; and a plurality of light sources disposed on a surface of the first substrate, and a wavelength conversion member disposed over the light source member to overlap the light source member, the wavelength conversion member including a second substrate and a plurality of wavelength conversion patterns disposed on a surface of the second substrate, wherein the plurality of wavelength conversion patterns are disposed to be spaced apart from one another, and each of the plurality of wavelength conversion patterns covers at least one of the plurality of light sources.

The plurality of wavelength conversion patterns may include a binder layer and wavelength conversion particles and scattering particles may be dispersed in the binder layer.

In an embodiment, the light source member may further include at least a reflective barrier, and the plurality of light sources may be disposed to be spaced apart from one another and the at least a reflective barrier may be disposed on the one surface of the first substrate on which the respective plurality of light sources are exposed.

A width of a lower surface of at least one of the plurality of wavelength conversion patterns may be greater than a distance between reflective barriers to completely cover a space between the reflective barriers.

In an embodiment, the plurality of light sources and the reflective barrier may not overlap each other in a thickness direction.

In an embodiment, the plurality of light sources and surfaces of the reflective barrier adjacent to the plurality of light sources may be spaced apart from each other.

In an embodiment, the wavelength conversion patterns may at least partially overlap the reflective barrier.

In an embodiment, the reflective barrier may include a barrier portion and a reflective coating layer disposed on the barrier portion.

In an embodiment, the reflective coating layer may include a first reflective coating layer disposed on an upper surface of the barrier portion.

In an embodiment, the reflective coating layer may further include a second reflective coating layer disposed on a side surface of the barrier portion.

In an embodiment, the light source member may further include a protective resin covering an upper surface and at least a side surface of each of the plurality of light sources.

In an embodiment, the each of the plurality of light sources and a side surface of the reflective barrier adjacent to the plurality of light sources may be spaced apart from each other, and the protective resin may fill a space between each of the plurality of light sources and the side surface of the reflective barrier adjacent to each of the plurality of light sources.

In an embodiment, the wavelength conversion member may further include a capping layer covering the plurality of wavelength conversion patterns.

In an embodiment, the second substrate may include glass.

In an embodiment, the surface of the first substrate and the surface of the second substrate may face each other.

According to an embodiment of the disclosure, a backlight unit comprises a light source member including a first substrate, and a plurality of light sources disposed on a surface of the first substrate; and a wavelength conversion member disposed to overlap the light source member and the wavelength conversion member including a second substrate containing glass and a wavelength conversion layer disposed on a surface of the second substrate.

In an embodiment, the wavelength conversion member may further include a capping layer covering the wavelength conversion layer.

In an embodiment, the plurality of light sources may be disposed to be spaced apart from each other.

According to an embodiment of the disclosure, a display device comprises a backlight unit comprising a light source member including a first substrate; and a plurality of light sources disposed on a surface of the first substrate and a wavelength conversion member disposed to overlap the light source member and the wavelength conversion member including a second substrate and a plurality of wavelength conversion patterns disposed on a surface of the second substrate; and a display panel disposed over the backlight unit, wherein the plurality of wavelength conversion patterns are disposed to be spaced apart from one another, and each of the wavelength conversion patterns covers at least one of the plurality of light sources.

In an embodiment, wherein the light source member may further include a reflective barrier, the plurality of light sources may be disposed to be spaced apart from one another, the reflective barrier may be disposed on the one surface of the first substrate on which the respective light sources are exposed, the wavelength conversion member may further include a capping layer covering the plurality of wavelength conversion patterns, and the second substrate may include glass.

In an embodiment, wherein the backlight unit may further include a diffusion plate disposed on an upper portion of the wavelength conversion member, and at least one optical sheet disposed on an upper portion of the diffusion plate.

In an embodiment, wherein the at least one optical sheet may include a prism sheet and a reflective polarizing sheet sequentially stacked in an upward direction.

BRIEF DESCRIPTION OF THE DRAWINGS

The above and other aspects and features of the disclosure will become more apparent by describing in detail embodiments thereof with reference to the accompanying drawings, in which.

DETAILED DESCRIPTION OF THE EMBODIMENTS

Figure 1:
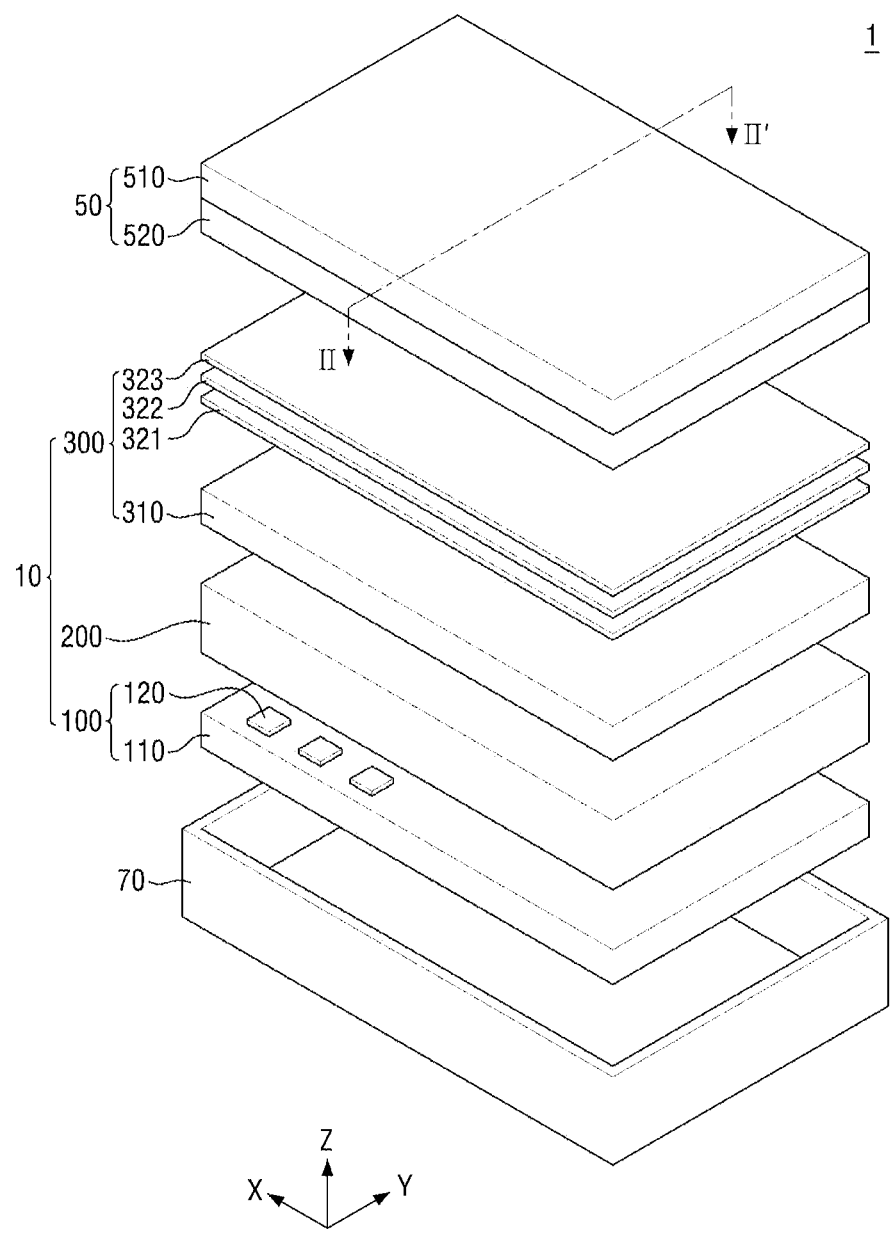
FIG. 1 is an exploded perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope to those of ordinary skill in the art to which the disclosure pertains.

Some of the parts which are not associated with the description may not be provided in order to describe embodiments and like reference numerals refer to like elements throughout the specification.

In the accompanying drawings, sizes and thicknesses of constituent member elements may be enlarged for better understanding, clarity, and ease of description thereof. However, the disclosure is not limited to the illustrated sizes and thicknesses.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further, when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relationships between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, or 5% of the stated value.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described with reference to the drawings.

Figure 2:
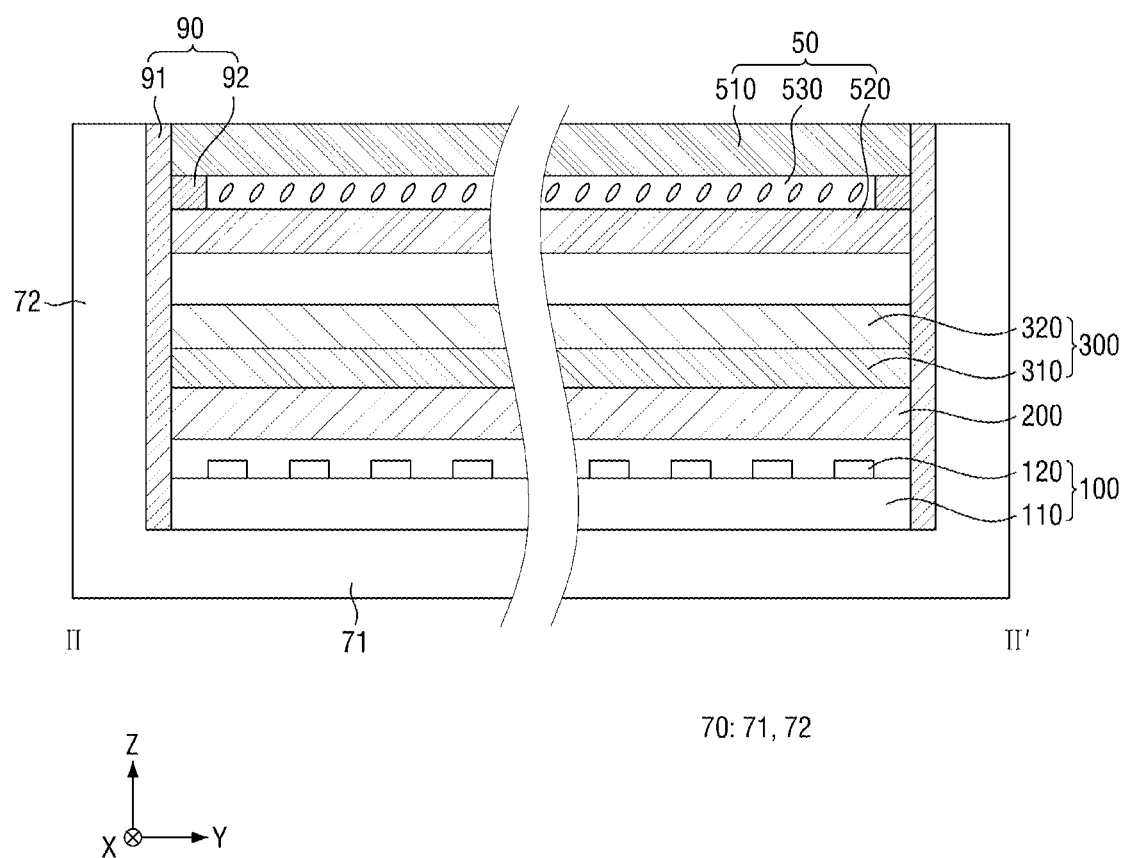
FIG. 2 is a schematic cross-sectional view taken along line II-II' of FIG. 1.

FIG. 1 is an exploded perspective view of a display device according to an embodiment. FIG. 2 is a schematic cross-sectional view taken along line II-II' of FIG. 1.

Referring to FIGS. 1 and 2, a display device 1 is a device for displaying an image, and may include various electronic devices such as a television, an external billboard, a monitor, a personal computer, a laptop computer, a tablet PC, a smart phone, a car navigation unit, a camera, a center information display (CID) provided in vehicles, a wrist watch type electronic device, a PDA (Personal Digital Assistant), a PMP (Portable Multimedia Player), a game machine or the like. The above list of various electronic devices is non exhaustive and may include other electronic devices within the spirit and scope of the disclosure.

In the drawings, a first direction X, a second direction Y, and a third direction Z are defined. The first direction X and the second direction Y may be perpendicular to each other in a plane. The third direction Z may be perpendicular to the plane in which the first direction X and the second direction Y are located. The third direction Z may be perpendicular to the first direction X and the second direction Y, respectively. In embodiments, the third direction Z indicates a thickness direction of the display device 1.

The display device 1 is not limited to, but may have a rectangular shape in which a distance in the first direction X may be greater than a distance in the second direction Y. The display device 1 may have a display surface disposed at one side (upward in the drawings) in the third direction Z which is the thickness direction. Unless otherwise specified in the embodiments, the term 'upward' or the term 'above' or 'over' refers to an indication direction toward one side in the third direction Z, and similarly to this, an upper surface refers to a surface directed toward one side in the third direction (Z). The term 'downward' or the term 'below' or 'under' may refer to a direction toward the other side in the third direction Z, which is opposite to the indication direction. A lower surface may refer to a surface directed toward the other side in the third direction (Z).

The display device 1 may include a display panel 50, a backlight unit 10 disposed under the display panel 50 and providing light to the display panel 50, and a housing 70 accommodating the display panel 50 and the backlight unit 10 therein.

The display panel 50 may display a screen by receiving the light emitted from the backlight unit 10. The display panel 50 may be a light receiving display panel, for example, a liquid crystal display panel, an electrowetting display panel, an electrophoretic display panel, or the like. Hereinafter, an example in which the display panel 50 is a liquid crystal display panel (LCD) will be exemplified. However, the following descriptions may be applied in a similar manner to other types of display panels.

The display panel 50 may include of pixels. The pixels of the display panel 50 may be arranged in a matrix. The display panel 50 may include a switching element and a pixel electrode provided for each pixel, and a common electrode facing the pixel electrode. The display panel 50 may include an upper substrate 510 and a lower substrate 520 facing the upper substrate 510, as shown in FIG. 2. The switching element and the pixel electrode described above may be disposed in the lower substrate 520 and the common electrode may be disposed in the lower substrate 520 or the upper substrate 510. The display panel 50 may further include a liquid crystal layer 530 disposed between the upper substrate 510 and the lower substrate 520. A sealing member 92 may be disposed on edges of the upper substrate 510 and the lower substrate 520 to confine the liquid crystal molecules of the liquid crystal layer 530. The sealing member 92 and an adhesive tape 91 may form a sealing structure 90.

The backlight unit 10 is disposed under the display panel 50. The backlight unit 10 may include a light source member 100, a wavelength conversion member 200, and an optical member 300.

The light source member 100 may include a first substrate 110 and light sources 120 disposed on the first substrate 110. The light sources 120 emit light provided to the display panel 50. The light emitted from the light sources 120 may be incident on a wavelength conversion member 200 disposed thereabove.

The wavelength conversion member 200 may be disposed to overlap an upper portion of the light source member 100. The wavelength conversion member 200 may convert a wavelength of at least a portion of the light incident thereon.

The light source member 100 and the wavelength conversion member 200 will be described in detail later.

An optical member 300 may be disposed on the wavelength conversion member 200. The optical member 300 may include an optical sheet and/or an optical plate. Examples of the optical sheet 320 may include a prism sheet, a micro lens, a lenticular sheet, a diffusion sheet, a polarizing sheet, a reflective polarizing sheet, a retardation sheet, a protective sheet and the like. Examples of the optical plate may include a diffusion plate, a light guide plate, and the like.

In the drawings, a structure in which a diffusion plate 310, a first prism sheet 321, a second prism sheet 322, and a reflective polarizing sheet 323 are sequentially stacked in an upward direction is exemplified. However, the disclosure may not be limited thereto.

The diffusion plate 310 may perform a function of diffusing light emitted from the wavelength conversion member 200 to the display panel 50. The first prism sheet 321 and the second prism sheet 322 may serve to refract a travelling path of light and increase front brightness. The reflective polarizing sheet 323 may transmit a polarized light or a specific polarized light and reflect and recycle other polarized light, thereby increasing brightness.

The housing 70 accommodates the backlight unit 10 and the display panel 50. The housing 70 may include a bottom chassis or bracket. Although not shown in the drawings, the housing may further include a top chassis.

The housing 70 may include a bottom surface 71 and a side wall 72. The light source member 100 of the backlight unit 10 may be disposed on the bottom surface 71 of the housing 70. The wavelength conversion member 200 and the optical member 300 of the backlight unit 10 and the display panel 50 may be fixed to the side wall 72 of the housing through an adhesive tape 91. However, the disclosure is not limited thereto, and the members may be mounted on another seating structure of the housing 70, or may be mounted on or attached to a mold frame provided in the interior of the housing 70.

Hereinafter, the light source member 100 and the wavelength conversion member 200 will be described in detail.

Figure 3:
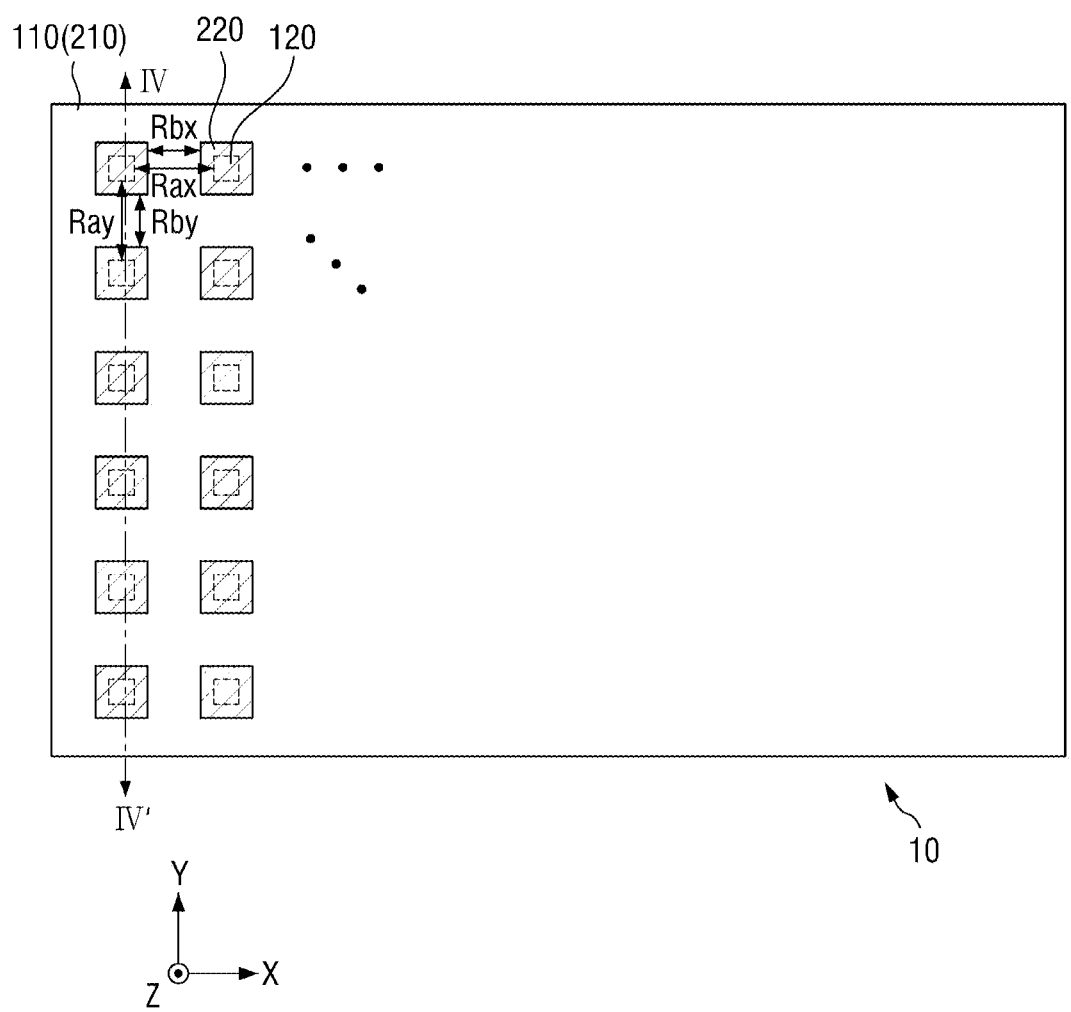
FIG. 3 is a layout view showing a relative positional relationship between the light sources of the light source member and wavelength conversion patterns of the wavelength conversion member.

FIG. 3 is a layout view showing a relative positional relationship between the light sources 120 of the light source member 100 and wavelength conversion patterns of the wavelength conversion member 200 with respect to the backlight unit 10.

Referring to FIG. 3, the light sources 120 may be arranged in a matrix form. The light sources 120 may be spaced apart from one another in the first direction X and the second direction Y and may be disposed at a predetermined interval. Here, for example, the light sources 120 are spaced apart from one another, which means that they are spaced apart from one another with respect to light emitting units of the respective light sources 120. Accordingly, even in a case in which light source packages of the respective light sources 120 are adjacent to or connected to one another as well as in a case where the light source packages forming the respective light sources are spaced apart from one another, when the light emitting units of the light sources 120 are spaced apart from one another, it is interpreted that the light sources 120 are spaced apart from one another.

In the drawings, a case in which arrangement directions of the light sources 120 correspond to a length direction and a width direction of the display device is illustrated, but the disclosure is not limited thereto. The arrangement directions of the light sources 120 and the length direction and the width direction of the display device may be inclined at a predetermined slope.

Distances Rax in the first direction X and distances Ray in the second direction Y of the respective light sources 120 may be identical to one another, as shown in FIG. 3. However, the disclosure is not limited to this, and the distances Rax between two adjacent light sources 120 in the first direction X and the distances Ray between two adjacent light sources 120 in the second direction Y may be different from each other. FIG. 3 illustrates that respective rows and columns of an array of the light sources 120 are linearly extended, but neighboring rows or neighboring columns of the light sources 120 may be alternately arranged.

The wavelength conversion member 200 includes wavelength conversion patterns 220. The respective wavelength conversion patterns 220 may be spaced apart at a predetermined interval. The wavelength conversion patterns 220 may be spaced apart from one another by a predetermined distance in the first direction X and the second direction Y. Each of the wavelength conversion patterns 220 may be disposed to overlap at least one individual light source 120 in the thickness direction. For example, each wavelength conversion pattern 220 may overlap one light source 120 such that each wavelength conversion pattern 220 and each light source 120 are disposed to correspond to each other.

The wavelength conversion pattern 220 may cover at least one light source 120. In one embodiment, the wavelength conversion pattern 220 may completely cover the light source 120. For example, the area of the wavelength conversion pattern 220 may be greater than the area of the light source 120 corresponding to the wavelength conversion pattern 220, so that the light source 120 may be completely covered in a direction of the display surface.

The distance Rbx between the two adjacent wavelength conversion patterns 220 in the first direction X and the distance Rby between the two adjacent wavelength conversion patterns 220 in the second direction Y may be identical to each other. However, the disclosure is not limited to this, and depending on a shape of the individual wavelength conversion patterns 220, the distance Rbx between the two adjacent wavelength conversion patterns 220 in the first direction X and the distance Rby between the two adjacent wavelength conversion patterns 220 in the second direction Y may be different from each other.

Figure 4:
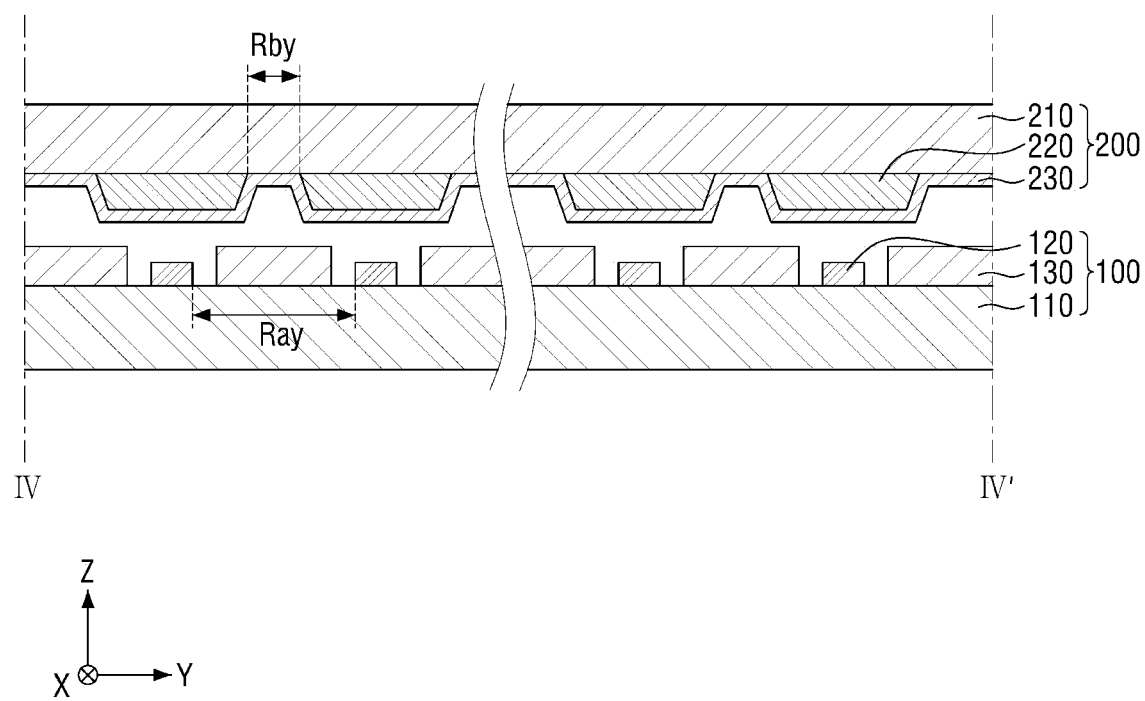
FIG. 4 is a schematic cross-sectional view of the light source member and the wavelength conversion member taken along line IV-IV' of FIG. 3.
Figure 5:
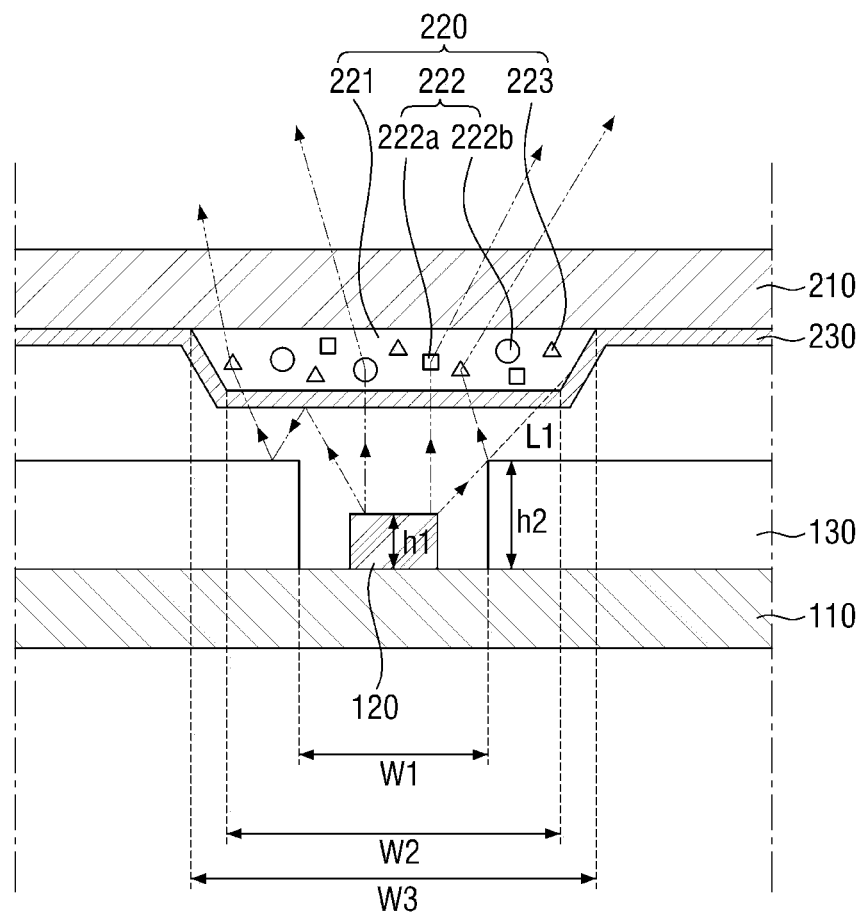
FIG. 5 is an enlarged view of a portion where one light source is arranged in the schematic cross-sectional view of FIG. 4.

FIG. 4 is a schematic cross-sectional view of the light source member 100 and the wavelength conversion member 200 taken along line IV-IV' of FIG. 3. FIG. 5 is an enlarged view of a portion where one light source 120 is arranged in the schematic cross-sectional view of FIG. 4.

Referring to FIGS. 4 and 5, the light source member 100 may include the first substrate 110, the light sources 120 disposed on the first substrate 110, and reflective barriers 130 disposed on the first substrate 110.

The first substrate 110 may be an insulating substrate or a circuit board. When the first substrate 110 is an insulating substrate, the first substrate 110 may include a transparent material such as glass, quartz or the like, or may include a polymer material such as polyimide or the like. The first substrate 110 may be any other suitable material as may be appreciated and understood by those of ordinary skill in the art. When the first substrate 110 is an insulating substrate, the light source member 100 may further include a circuit element layer (refer to as '110a' in FIG. 28) for driving the light source 120. The circuit element layer may be formed on one surface of the insulating substrate, or may be formed of a printed circuit board or the like and attached or fixed to one surface of the insulating substrate. The light source member 100 including a circuit element layer will be described later with reference to FIG. 28.

The first substrate 110 may have a planar shape substantially similar to the display panel 50. For example, when the display panel 50 has a rectangular planar shape, the first substrate 110 may also have a similar rectangular planar shape. In a plan view, the first substrate 110 may have a size substantially the same as that of the display panel 50, but it is not limited thereto.

The light sources 120 may be disposed on one surface of the first substrate 110 (for example, a surface facing one side in the third direction Z). Each light source 120 is not limited to, but may include a light emitting diode (LED). A diffusion lens or the like may be disposed on the light source 120, but the LED may be directly exposed without a separate lens as shown in the drawings. A direction in which light of the light source 120 emits may be generally upward in the drawings.

The light sources 120 may emit light of a wavelength band or a specific wavelength band. For example, the light sources 120 may emit blue light having a wavelength band of in a range of about 420 nm to about 470 nm. In some embodiments, the light sources 120 may emit light having two or more peak wavelengths. For example, the light sources 120 may emit light having a near-ultraviolet wavelength and blue light.

The reflective barrier 130 may be disposed at a position in one surface of the first substrate 110 at which the light sources 120 are not disposed. The reflective barrier 130 may change a traveling direction of light leaking laterally out of light emitted from the light source 120 to an upward direction in which the wavelength conversion pattern 220 may be located.

The reflective barrier 130 may include a reflective material. The reflective barrier 130 may be formed of, a metal-containing material, for example, silver (Ag), copper (Cu), aluminum (Al), nickel (Ni), lanthanum (La) or an alloy thereof, indium tin oxide (ITO), indium zinc oxide (IZO), indium tin-zinc oxide (ITZO), or the like, but it is not limited thereto.

The reflective barrier 130 may be disposed to surround the light sources 120 in a plan view. The reflective barrier 130 may have a lattice shape surrounding the light sources 120 arranged in a matrix form. In one embodiment, the reflective barrier 130 on the first substrate 110 may be spaced apart from the light sources 120 in a horizontal direction. The reflective barrier 130 may not overlap the light sources 120 on the first substrate 110 in the thickness direction.

The reflective barrier 130 may include an upper surface, a lower surface, and a side surface. The lower surface of the reflective barrier 130 may be placed on one surface of the first substrate 110. The upper surface of the reflective barrier 130 may face the lower surfaces of the reflective barrier 130. Each of the upper and lower surfaces of the reflective barriers 130 may be located on one plane, and the planes on which the upper surface and the lower surface may be located may be generally parallel to each other to have a uniform overall thickness.

The side surface of the reflective barrier 130 may face the light source 120. In the illustrated embodiment, the plane on which the side surface of the reflective barrier 130 is located may form an angle of about 90° with the plane on which the upper surface and/or lower surface of the reflective barrier 130 is located. Accordingly, the plane on which the upper surface of the first substrate 110 is positioned and the plane on which the side surface of the reflective barrier 130 is positioned may form an angle of about 90°

A thickness of the reflective barrier 130 (for example, a distance h2 from the upper surface of the first substrate 110 to the upper surface of the reflective barrier 130 in the third direction Z) may be greater than or equal to a thickness of the light source 120 (for example, a distance h1 from the upper surface of the first substrate 110 to the upper surface of the light source 120 in the thickness direction). The thickness h2 of the reflective barrier 130 being greater than the thickness h1 of the light source 120 may be effective in preventing light emitted from the light source 120 from leaking into a space between the wavelength conversion patterns 220.

The wavelength conversion member 200 may include a second substrate 210, wavelength conversion patterns 220 disposed on one surface of the second substrate 210 and a capping layer 230 disposed on the wavelength conversion patterns 220. The second substrate 210, the wavelength conversion patterns 220, and the capping layer 230 may be integrated to form the wavelength conversion member 200. FIGS. 4 and 5 illustrate the wavelength conversion patterns 220 disposed between the second substrate 210 and the light sources 120, but the disclosure is not limited thereto, and the second substrate 210 may be disposed between the wavelength conversion patterns 220 and the light sources 120.

The second substrate 210 may be formed of a light-transmissive material. The second substrate 210 may include glass. In some embodiments, the second substrate 210 may be a glass substrate. The glass substrate may have sufficient rigidity and may not be easily deformed by heat. Therefore, when the glass substrate is used as the second substrate 210, even when the wavelength conversion member 200 is disposed close to upper portions of the light sources 120, a phenomenon in which the second substrate 210 is bent by heat generated from the light sources 120, or wrinkles, or otherwise deformed, may be prevented. Further, the transmission of heat generated from the light sources 120 to a diffusion plate 310 disposed over the wavelength conversion member 200 may be blocked to prevent the diffusion plate 310 from being deformed due to heat. However, the disclosure is not limited thereto, and the second substrate 210 may be formed of a plastic substrate such as polyethylene terephthalate (PET), polycarbonate (PC), polyimide (PI), or any other suitable material as may be appreciated and understood by those of ordinary skill in the art.

The second substrate 210 of the wavelength conversion member 200 may have a planar shape substantially similar to the display panel 50, like the first substrate 110 described above.

The wavelength conversion patterns 220 corresponding to the light sources 120 may be disposed on one surface of the second substrate 210 as described above. Here, in both surfaces of the second substrate 210, one surface of the second substrate 210 is a surface facing the light sources 120, and means a lower surface facing the other side in the third direction Z. One surface of the second substrate 210 faces one surface of the first substrate 110 upon which the light sources 120 may be disposed. The wavelength conversion patterns 220 convert a wavelength of at least a portion of light emitted from the light sources 120 and light reflected by the reflective barrier 130.

The wavelength conversion patterns 220 may include a binder layer 221 and wavelength conversion particles 222 dispersed in the binder layer 221. As an example, the wavelength conversion patterns 220 may further include scattering particles 223 dispersed in the binder layer 221 along with the wavelength conversion particles 222.

The binder layer 221 may be a medium in which the wavelength conversion particles 222 may be dispersed, and may be formed of various resin compositions. However, the disclosure is not limited thereto, and in the specification, in so far as any medium is capable of dispersedly arranging the wavelength conversion particles 222 and/or scattering particles 223, such a medium may be referred to as the binder layer 221, regardless of its name.

The wavelength conversion particles 222 are particles that convert a wavelength of incident light, and may be, for example, quantum dots (QD), a fluorescent material, or a phosphorescent material. Hereinafter, the wavelength conversion particles 222 are described as quantum dots, but the disclosure is not limited thereto.

A quantum dot is a material having a crystal structure of a few nanometers in size and is configured of hundreds to thousands of atoms, and exhibits a quantum confinement effect in which an energy band gap is increased due to a small size. When a light of a wavelength having a level of energy higher than that of the band gap is incident on the quantum dots QD, the quantum dots QD absorb the light to be excited and emit light of a specific wavelength and drop to a ground state. The emitted light of the wavelength has a value corresponding to the band gap. When a size and a composition of the quantum dots QD are controlled, light transmissive properties due to the quantum confinement effect may be controlled.

The quantum dots may include at least one of, for example, Group II-VI compounds, Group II-V compounds, Group III-V compounds, Group III-V compounds, Group IV-VI compounds, Group compounds, Group II-IV-VI compounds and Group II-IV-V compounds.

The quantum dot may include a core and a shell overcoating the core. The core may be, at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si and Ge. The shell is not limited to, but may include at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe.

The wavelength conversion particles 222 may include wavelength conversion particles 222 that convert incident light to light of different wavelengths. For example, the wavelength conversion particles 222 may include a first wavelength conversion particle 222a that converts incident light of a specific wavelength into light of a first wavelength and emits the light of the first wavelength and a second wavelength conversion particle 222b that converts incident light of a specific wavelength into light of a second wavelength and emits the light of the second wavelength. In an embodiment, light emitted from a light source 120 and incident on the wavelength conversion particles 222 may be blue wavelength light, and the first wavelength may be a green wavelength and the second wavelength may be a red wavelength. For example, the blue wavelength may be a wavelength having a peak at about 420 nm to about 470 nm, the green wavelength may be a wavelength having a peak at about 520 nm to about 570 nm, and the red wavelength may be a wavelength having a peak at about 620 nm to about 670 nm. However, it should be understood that the blue, green, and red wavelengths are not limited to the above examples and include all wavelength ranges that may be recognized as blue, green, and red colors in the art.

In the embodiment, as the blue light incident on a wavelength conversion pattern 220 passes through the wavelength conversion pattern 220, a portion of the blue light is incident on the first wavelength conversion particle 222a, is converted into light of a green wavelength and is emitted as the light of the green wavelength, another portion of the blue light is incident on the second wavelength conversion particle 222b, is converted into light of a red wavelength and is emitted as light of the red wavelength, and a remaining portion of the blue light may be emitted without being incident on the first wavelength conversion particle 222a and the second wavelength conversion particle 222b. Therefore, the light having passed through the wavelength conversion pattern 220 includes all of light of the blue wavelength, light of the green wavelength, and light of the red wavelength. When a ratio of the emitted light of different wavelengths is appropriately adjusted, the emitted light of white color or other colors may be realized and displayed.

The wavelength conversion patterns 220 may further include scattering particles 223. The scattering particles 223 may be non-quantum particles and may not have wavelength conversion functions. The scattering particles 223 scatter incident light so that more incident light may be incident onto the wavelength conversion particles 222. For example, the scattering particles 223 may uniformly control an emitting angle of light for each wavelength. As another example, when a portion of incident light is incident onto the wavelength conversion particles 222 and then, is converted into light of a different wavelength and is emitted as the light of the different wavelength, scattering characteristics in which an emission direction of the light is random may be exhibited. When the scattering particles 223 are not present in the wavelength conversion patterns 220, light of the green and red wavelengths emitted after colliding with the wavelength conversion particles 222 may have scattering emission properties, but light of the blue wavelength emitted without the collision with the wavelength conversion particles 222 may have no scattering emission properties, whereby an emission amount of light having a blue/green/red wavelength may be different according to an emission angle. The scattering particles 223 may impart scattering emission characteristics even to light of the blue wavelength emitted without the collision with the wavelength conversion particles 222, whereby the emission angle according to the wavelength may be similarly controlled. As the scattering particles 223, TiO2, SiO2 and the like may be used.

According to one embodiment, the wavelength conversion patterns 220 may include an upper surface, a lower surface and a side surface. The upper surface of the wavelength conversion patterns 220 may be placed on one surface of the second substrate 210. The lower surface of the wavelength conversion patterns 220 may face the upper surface of the wavelength conversion patterns 220. Each of the upper surface and the lower surface of the wavelength conversion patterns 220 may be located on one plane, and the planes where the upper surface and the lower surface may be located may be generally parallel to each other to have a uniform overall thickness.

In some embodiments, a width W3 of the upper surface of a wavelength conversion pattern 220 and a width W2 of the lower surface of the wavelength conversion pattern 220 may be different from each other. For example, the side surface of the wavelength conversion pattern 220 may be inclined at an acute angle with respect to one surface of the second substrate 210. In this case, the width W3 of the upper surface of the wavelength conversion pattern 220 may be greater than the width W2 of the lower surface of the wavelength conversion pattern 220

The width W2 of the lower surface of the wavelength conversion pattern 220 may be greater than a distance between two adjacent reflective barriers 130 surrounding the light source 120 corresponding to the wavelength conversion pattern 220 (a width W1 between the adjacent reflective barriers 130 in the second direction Y). Thus, the side surface of the wavelength conversion pattern 220 may at least partially overlap the reflective barriers 130 in the third direction Z and a portion of the upper surface and/or the lower surface of the wavelength conversion pattern 220 may overlap the reflective barriers 130 in the third direction Z.

The width W2 of the lower surface of the wavelength conversion pattern 220 may be greater than the distance W1 between the adjacent two reflective barriers 130 surrounding the light source 120. When the width W2 of the lower surface of the wavelength conversion pattern 220 is greater than the distance W1 between the reflective barriers 130 to completely cover a space between the reflective barriers 130, the leakage of light to a space between the reflective barriers 130 and the wavelength conversion pattern 220 may be reduced. A detailed description of a path of the light emitted from a light source 120 to the wavelength conversion member 200 will be described later.

A capping layer 230 may be disposed on the wavelength conversion patterns 220. The capping layer 230 may cover the side surface and the lower surface of the wavelength conversion patterns 220. The capping layer 230 may cover one surface of the second substrate 210 to which the wavelength conversion patterns 220 may be exposed. In one embodiment, a single, integrated capping layer 230 may cover the wavelength conversion patterns 220 spaced apart from one another.

The capping layer 230 may prevent penetration of moisture and/or oxygen (hereinafter, referred to as 'moisture/oxygen'). The capping layer 230 may include an inorganic material. For example, the capping layer 230 may include silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film having a light transmittance secured. In an embodiment, the capping layer 230 may be formed of silicon nitride.

Hereinafter, the travelling path of light emitted from a light source 120 to the reflective barrier 130 or the wavelength conversion member 200 will be described in detail with reference to FIG. 5.

As described above, the light emitted from the light source 120 generally proceeds upward and may be incident on the wavelength conversion pattern 220 disposed above the light source 120. On the other hand, some of the light emitted from the light source 120 may proceed toward the wavelength conversion pattern 220, but may be reflected from layers disposed above the light source 120 such as the capping layer 230 or the like and may not enter the wavelength conversion pattern 220. The upper surface of the reflective barrier 130 may increase light efficiency by allowing the light reflected from the upper side to re-enter the wavelength conversion pattern 220.

Other portions of the light emitted from the light source 120 may be directed laterally. The side surface of the reflective barrier 130 may be disposed in a lateral direction of the light source 120, reflects light directed in the lateral direction and allows the light to enter the wavelength conversion pattern 220.

To maximize light efficiency through reflection of the reflective barrier 130, it is desirable to establish an appropriate arrangement relationship of the light source 120, the reflective barrier 130 and the wavelength conversion pattern 220. For example, when a line connecting an upper left portion of the reflective barrier 130 located in the right of the light source 120 and an upper right portion of the light source 120 is referred to as a reference line L1, a point where the reference line L1 and the plane on which the lower surface of the wavelength conversion pattern 220 is located meet may be positioned in the interior of the wavelength conversion pattern 220, whereby light emitted from the light source 120 and incident on the wavelength conversion member 200 may be advantageously incident on the wavelength conversion pattern 220. For example, the width W2 of the lower surface of the wavelength conversion pattern 220 may be formed such that the reference line L1 is positioned in the interior of the wavelength conversion pattern 220, thereby effectively preventing the light emitted from the light source 120 from leaking to a space between the wavelength conversion member 200 and the light source member 100.

According to the embodiments, although the wavelength conversion pattern 220 may be formed only on a portion of one surface of the second substrate 210, the reflective barrier 130 may appropriately be disposed, whereby the light emitted from the light source 120 may efficiently enter the wavelength conversion pattern 220. For example, since the wavelength conversion pattern 220 may be formed only on a partial area, the material cost may be reduced.

Hereinafter, other embodiments of the reflective barrier 130 of the light source member 100 will be described. In the following embodiments, description of the same elements as those of the previously described embodiments will be omitted or simplified, and differences therebetween will be mainly described. Although the following drawings illustrate the wavelength conversion member 200 in which the wavelength conversion patterns 220 may be disposed on the lower surface of the second substrate 210, various embodiments of structures described below may be applied to the wavelength conversion member 200.

Figure 6:
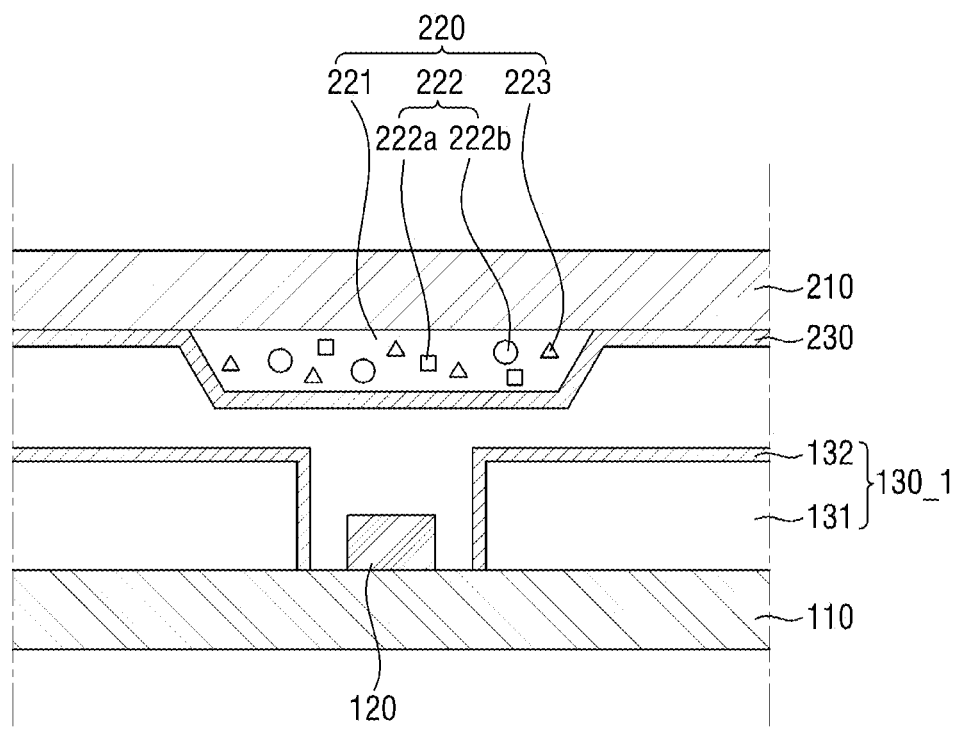
FIG. 6 is a schematic cross-sectional view of a light source member and a wavelength conversion member according to an embodiment.

FIG. 6 is a schematic cross-sectional view of a light source member and a wavelength conversion member according to an embodiment.

The embodiment of FIG. 6 illustrates that a reflective barrier 130_1 may include a barrier portion 131 and a reflective coating layer 132 disposed on the barrier portion 131.

As an example, the barrier portion 131 may have substantially the same shape as the reflective barrier 130 of FIG. 5. The reflective coating layer 132 may be disposed on upper and side surfaces of the barrier portion 131. The reflective coating layer 132 may cover both the upper surface and the side surface of the barrier portion 131.

The reflective coating layer 132 may include a material having high reflectance such as a metal. In an embodiment, the reflective coating layer 132 may include a material such as silver, copper, aluminum, nickel, lanthanum or an alloy thereof, indium tin oxide (ITO), indium zinc oxide (IZO), indium tin-zinc oxide (ITZO), but is not limited thereto. The reflective coating layer 132 may be directly deposited or coated on one surface of the barrier portion 131. As another example, the reflective coating layer 132 may be attached to the barrier portion 131 via an adhesive layer (not illustrated in FIG. 6).

A portion of the light emitted from the light source 120 and travelling laterally may be reflected by the reflective coating layer 132 and proceed toward the wavelength conversion pattern 220. The light having been reflected on an upper surface of the reflective barrier 130_1 without being incident on the wavelength conversion pattern 220 as described above may be recycled by the reflective coating layer 132 disposed on the upper surface of the barrier portion 131 and may re-enter the wavelength conversion pattern 220.

In this embodiment, since the reflection is performed by the reflective coating layer 132, the barrier portion 131 covered by the reflective coating layer 132 may include a non-reflective material or a low reflective material. Accordingly, the barrier portion 131 may be formed of a material that is easy to form, such as an organic material, and then the reflective coating layer 132 may be formed on the surface of the barrier portion 131 to thereby form the reflective barrier 130_1. Therefore, the manufacturing efficiency of the reflective barrier 130_1 may be improved.

Figure 7:
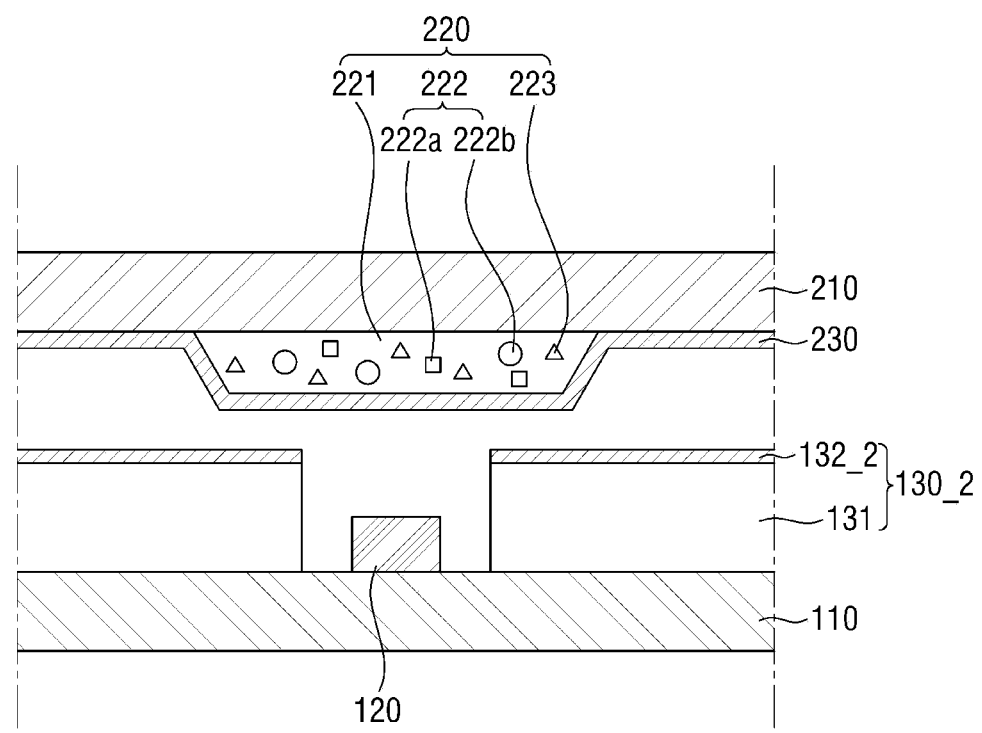
FIG. 7 is a schematic cross-sectional view of a light source member and a wavelength conversion member according to an embodiment.

FIG. 7 is a schematic cross-sectional view of a light source member and a wavelength conversion member according to an embodiment.

Referring to FIG. 7, a reflective barrier 130_2 according to the embodiment is different from the embodiment shown in FIG. 6 in that the reflective coating layer 132_2 may be disposed on the upper surface of the barrier portion 131 or may be disposed only on the upper surface of the barrier portion 131.

For example, the reflective coating layer 132_2 may be disposed so as to completely cover the upper surface of the barrier portion 131. A side surface of the reflective coating layer 132_2 may be aligned with the side surface of the barrier portion 131. The side surface of the reflective barrier 130_2 may be exposed without being covered by the reflective coating layer 132_2. Such a structure may be formed when the side surface of the barrier portion 131 is cut off by using a method such as punching or the like after the reflective coating layer 132_2 is entirely disposed on one surface of the barrier portion 131.

In the embodiment, reflective efficiency of light emitted from the light source 120 and travelling laterally may be low, however, light having been reflected on the upper surface of the reflective barrier 130_2 without being incident on the wavelength conversion pattern 220 is recycled by the reflective coating layer 132_2 disposed on the upper surface of the barrier portion 131 and re-enters the wavelength conversion pattern 220.

Figure 8:
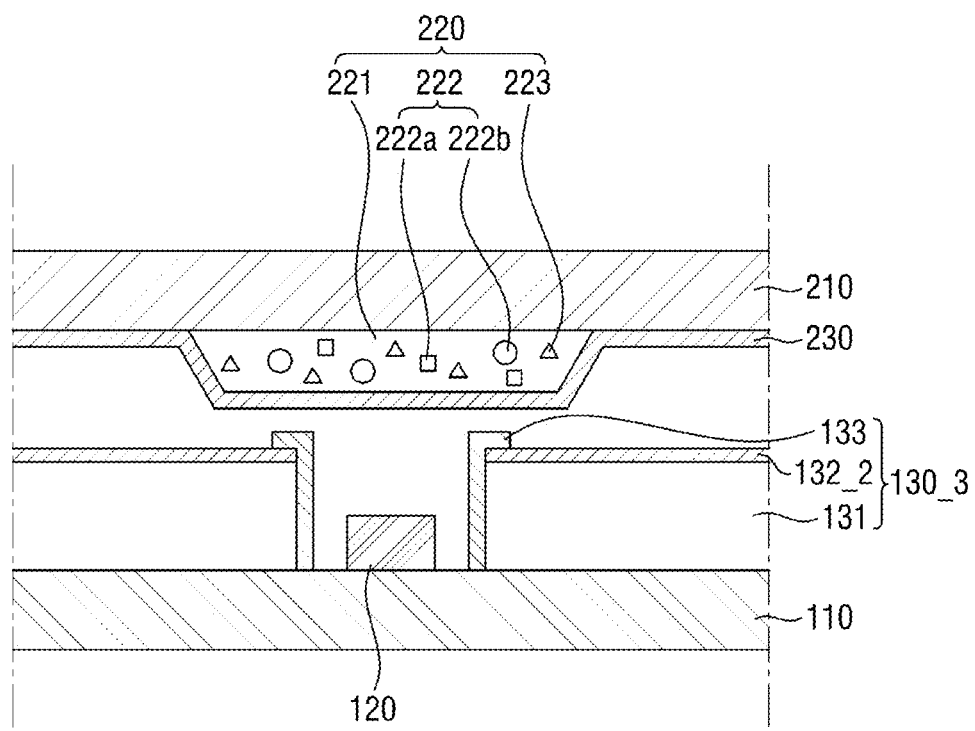
FIG. 8 is a schematic cross-sectional view of a light source member and a wavelength conversion member according to an embodiment.

FIG. 8 is a schematic cross-sectional view of a light source member and a wavelength conversion member according to an embodiment.

Referring to FIG. 8, a reflective barrier 130_3 according to the embodiment is different from the embodiment shown in FIG. 7 in that the reflective barrier 130_3 includes a second reflective coating layer 133 on a side surface of the barrier portion 131.

For example, the reflective barrier 130_3 may include a barrier portion 131, a first reflective coating layer 132_2 disposed entirely on the upper surface of the barrier portion 131 and the second reflective coating layer 133 disposed on a portion of an upper surface and a side surface of the first reflective coating layer 132_2 and disposed entirely on the side surface of the barrier portion 131.

In this embodiment, the first reflective coating layer 132_2 may recycle light having been reflected on the upper surface of the reflective barrier 130_3 without being incident on the wavelength conversion pattern 220 and may allow the recycled light to re-enter the wavelength conversion pattern 220. The second reflective coating layer 133 may reflect a portion of light emitted from the light source 120 and traveling laterally, whereby the portion of light may proceed toward the wavelength conversion pattern 220.

Similar to the embodiment of FIG. 7, the reflective barrier 130_3 may be formed by entirely disposing the first reflective coating layer 132_2 on one surface of the barrier portion 131, cutting the side surface of the barrier portion 131 with the use of a method such as punching or the like, and then, disposing the second reflective coating layer 133 on the side surface of the barrier portion 131.

Figure 9:
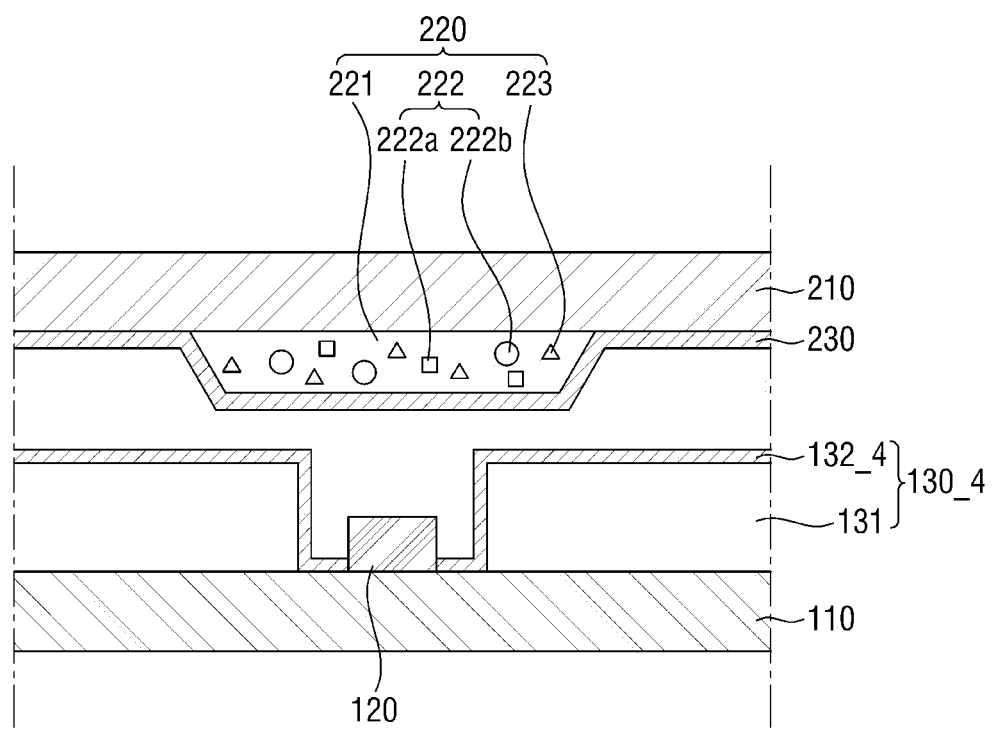
FIG. 9 is a schematic cross-sectional view of a light source member and a wavelength conversion member according to an embodiment.

FIG. 9 is a schematic cross-sectional view of a light source member and a wavelength conversion member according to an embodiment.

Referring to FIG. 9, a reflective barrier 130_4 according to the embodiment is different from the embodiment of FIG. 6 in that a reflective coating layer 132_4 is also disposed on the upper surface of the first substrate 110 exposed by the light source 120 and the barrier portion 131.

The reflective coating layer 132_4 may be disposed entirely on the upper surface and/or the side surface of the barrier portion 131. The reflective coating layer 132_4 may extend outwardly from the side surface of the barrier portion 131 and completely cover the upper surface of the first substrate 110 exposed by the light source 120 and the barrier portion 131. The reflective barrier 130_4 having such a structure may be formed when the barrier portion 131 is disposed on the first substrate 110 and then, the reflective coating layer 132_4 is applied thereto.

In the embodiment, when a portion of light having been emitted from the light source 120 is reflected on the upper surface of the first substrate 110 exposed by the light source 120 and the barrier portion 131, as well as a portion of light having been emitted from the light source 120 does not proceed to the wavelength conversion pattern 220 and is reflected on an upper surface and a side surface of the reflective barrier 130_4, a portion of the reflected light is recycled by the reflective coating layer 132_4, thereby allowing the light to re-enter the wavelength conversion pattern 220.

Figure 10:
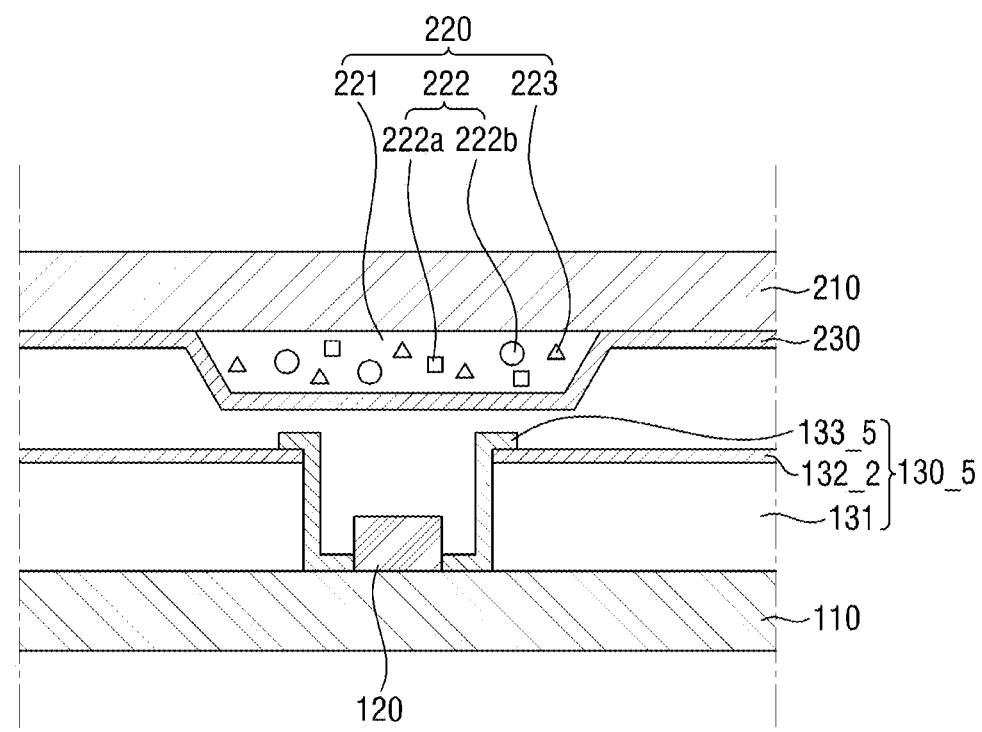
FIG. 10 is a schematic cross-sectional view of a light source member and a wavelength conversion member according to an embodiment.

FIG. 10 is a is a schematic cross-sectional view of a light source member and a wavelength conversion member according to an embodiment.

Referring to FIG. 10, a reflective barrier 130_5 according to the embodiment is different from the embodiment of FIG. 8 in that a second reflective coating layer 133_5 extends from the side surface of the barrier portion 131 and is disposed on the upper surface of the first substrate 110.

For example, the second reflective coating layer 133_5, which is disposed entirely on the side surface of the barrier portion 131, extends outwardly to completely cover the upper surface of the first substrate 110 exposed by the light source 120 and the barrier portion 131.

In the embodiment, similar to the embodiment of FIG. 9, the second reflective coating layer 133_5 may recycle a portion of light reflected on the upper surface of the first substrate 110 exposed by the light source 120 and the barrier portion 131 out of some light travelling toward the wavelength conversion pattern 220, thereby allowing the recycled light to re-enter the wavelength conversion pattern 220.

In the embodiments of FIG. 6 through FIG. 10, even when the reflective coating layers 132 and 133 are disposed on the upper surface and/or the side surface of the barrier portion 131 so that the barrier portion 131 includes a low reflective material or a non-reflective material, light emitted from the light source 120 may be incident on the wavelength conversion pattern 220 to minimize light leakage.

Figure 11:
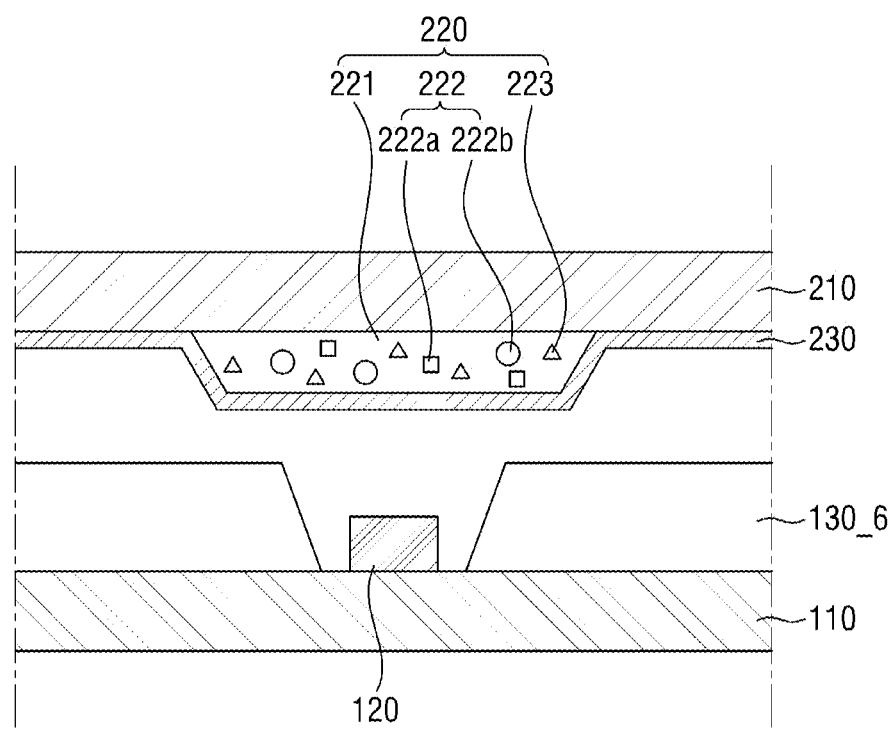
FIG. 11 is a schematic cross-sectional view of a light source member and a wavelength conversion member according to an embodiment.

FIG. 11 is a schematic cross-sectional view of a light source member and a wavelength conversion member according to an embodiment.

Referring to FIG. 11, the embodiment of FIG. 11 is different from the embodiment of FIG. 5 in that a side surface of a reflective barrier 130_6 is inclined at a predetermined angle other than 90° with respect to the plane on which the upper surface of the first substrate 110 is located.

For example, the side surface of the reflective barrier 130_6 disposed on the upper surface of the first substrate 110 may be inclined with respect to the upper surface of the first substrate 110. Accordingly, a spaced distance between the two adjacent reflective barriers 130_6 surrounding the light source 120 may vary in the second direction Y depending on the height thereof.

In this embodiment, the distance between the two adjacent reflective barriers 130_6 surrounding the light source 120 increases as the height of the reflective barriers 130_6 from the first substrate 110 increases. For example, an incident angle of light traveling toward the side surface of the reflective barrier 130_6 may be greater than an incident angle of light traveling toward the side surface of the reflective barrier 130_6 when the side surface of the reflective barrier 130_6 and the first substrate 110 are perpendicular to each other, as in the embodiment of FIG. 5. Therefore, an incident area of light reflected from the side surface of the reflective barrier 130_6 by the reflective barrier 130_6 and traveling on the wavelength conversion member 200 may be widened.

As the area of the wavelength conversion member 200 on which light having been emitted from the light source 120 is incident may be widened, it may be required to increase the area of the wavelength conversion pattern 220 so as to reduce light leakage. Therefore, it is less efficient in reducing the material cost of the wavelength conversion pattern 220, but the area of the light incident on the wavelength conversion member 200 is widened, thereby preventing the light emitted from the light source 120 from being concentrated only in a narrow area, Therefore, this may be efficient in producing a uniform brightness.

Figure 12:
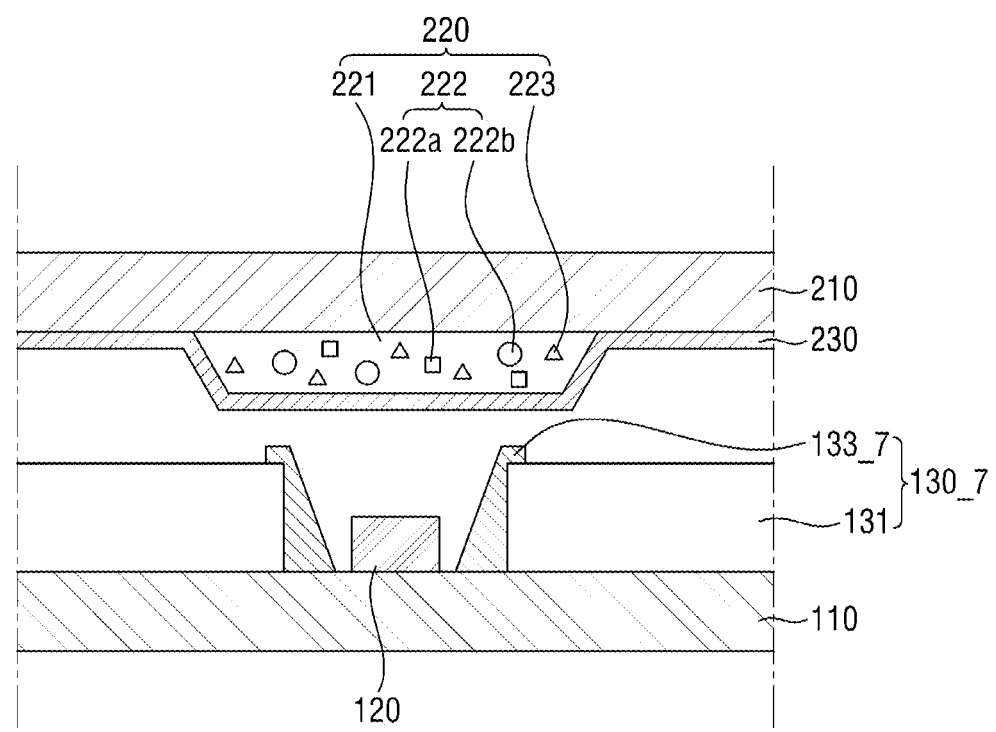
FIG. 12 is a schematic cross-sectional view of a light source member and a wavelength conversion member according to an embodiment.

FIG. 12 schematic cross-sectional view of a light source member and a wavelength conversion member according to an embodiment.

Referring to FIG. 12, the embodiment is different from the embodiment of FIG. 5 in that a reflective barrier 130_7 includes the barrier portion 131 and a reflective coating layer 133_7 on the side surface of the barrier portion 131, and the reflective coating layer 133_7 is disposed on the side surface of the barrier portion 131 and has a width varying in the second direction Y depending on the height thereof (a distance from the upper surface of the first substrate 110 in the third direction Z).

For example, the reflective barrier 130_7 may include the barrier portion 131 and the reflective coating layer 133_7 disposed entirely on the surface of the barrier portion 131.

The plane on which the side surface of the barrier portion 131 is located and the plane on which the upper surface of the first substrate 110 is located may form an angle of 90 degrees. The reflective coating layer 133_7 may cover the entirety of the side surface the barrier portion 131 and a portion of the upper surface of the barrier portion 131. The reflective coating layer 133_7 may have a narrow width as the height thereof in the thickness direction Z from the upper surface of the first substrate 110 increases. Therefore, the plane on which the side surface of the barrier portion 131 is located may be inclined at a predetermined angle with respect to the plane on which the upper surface of the first substrate 110 is located.

The embodiment is similar to the embodiment of FIG. 11 in that the area of the wavelength conversion member 200 on which light emitted from the light source 120 is incident may be widened due to the reflective coating layer 133_7 disposed on the side surface of the barrier portion 131, whereby it is less efficient in reducing the material cost of the wavelength conversion pattern 220, but it is feasible to prevent the light emitted from the light source 120 from being concentrated in a partial area.

Figure 13:
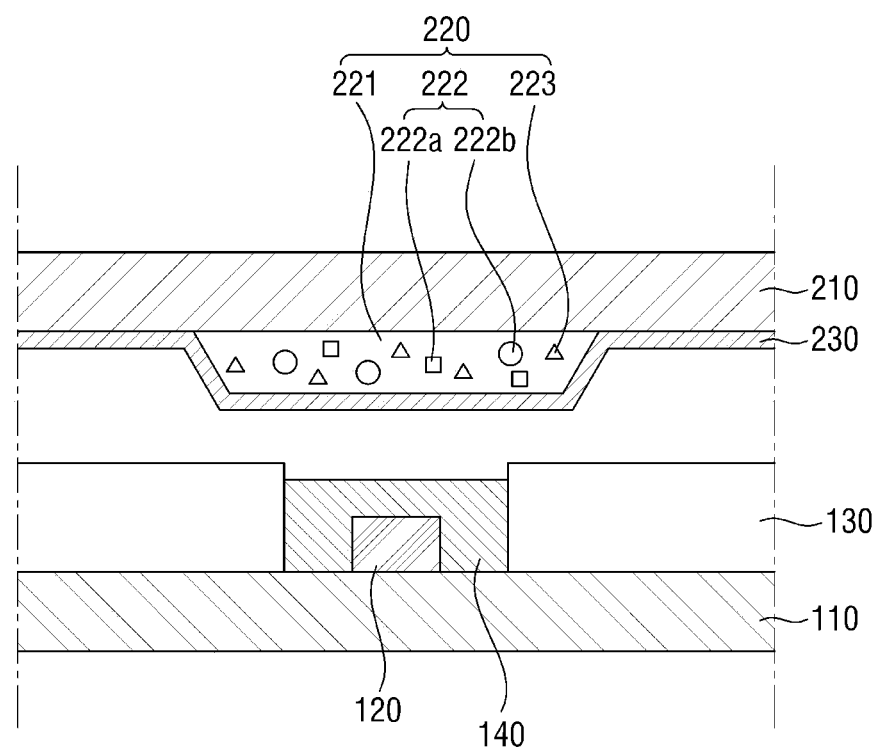
FIG. 13 is a schematic cross-sectional view of a light source member and a wavelength conversion member according to an embodiment.

FIG. 13 is a schematic cross-sectional view of a light source member and a wavelength conversion member according to an embodiment.

The embodiment of FIG. 13 is different from the embodiment of FIG. 5 in that the light source member 100 further includes a protective resin 140.

Referring to FIG. 13, the light source member 100 may further include a protective resin 140 in a space defined by the light source 120 and the reflective barrier 130 adjacent thereto. The protective resin 140 may fill the space formed between the light source 120 and the reflective barrier 130 adjacent thereto. The protective resin 140 may be disposed to cover both the upper surface and the side surfaces of the light source 120. The protective resin 140 may include a light-transmissive material. The protective resin 140 may include an epoxy resin, a silicone resin, or the like. However, the protective resin 140 is not particularly limited as long as it is a material that does not cause damage to the light source while transmitting light.

Figure 22:
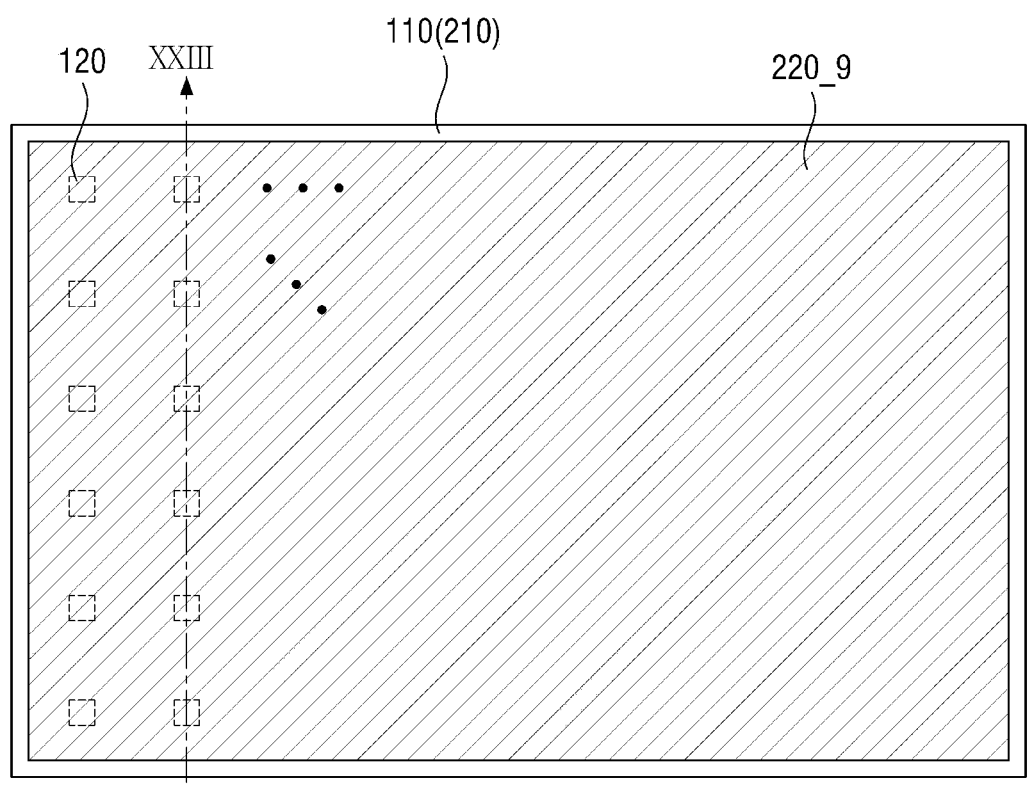
FIG. 22 is a layout view showing a relative positional relationship between a light source of the light source member and a wavelength conversion pattern of the wavelength conversion member according to an embodiment.

The protective resin 140 may cover the upper surface and the side surfaces of the light source 120 to protect the light source 120. For example, a portion of the heat of light emitted from the light source 120 may be blocked to prevent deformation of the wavelength conversion pattern 220. The protective resin 140 may diffuse the light emitted from at least one light source 120. In a case that a wavelength conversion layer 220_9 emits light to a wavelength conversion member 200_9 disposed entirely on the second substrate 210 as shown in the embodiment of FIG. 22 to be described later, light may be prevented from being concentrated.

Hereinafter, other embodiments of the wavelength conversion member 200 will be described. In the following embodiments, description of the same elements as those of the previously described embodiments will be omitted or simplified, and differences therebetween will be mainly described. Although the following several drawings illustrate the reflective barrier 130 having at least a side surface thereof perpendicular to the upper surface of the first substrate 110, various embodiments of structures described below may be applied to the reflective barrier 130 of the light source member 100.

Figure 14:
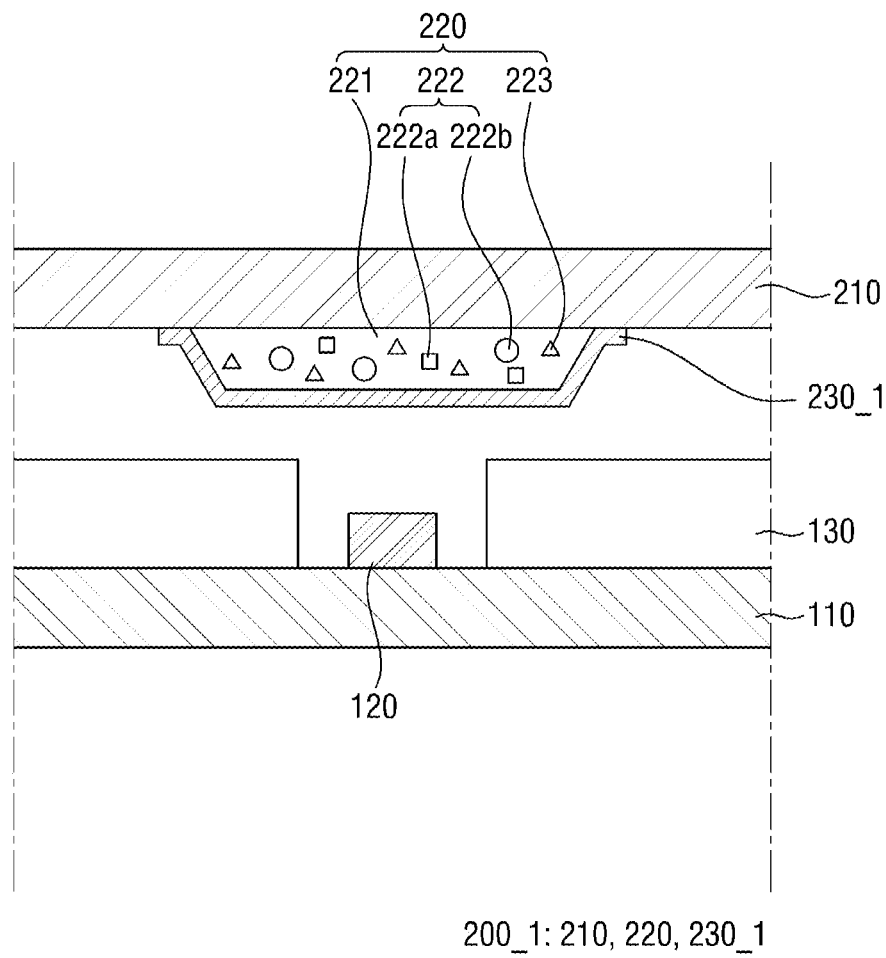
FIG. 14 is a schematic cross-sectional view of a light source member and a wavelength conversion member according to an embodiment.

FIG. 14 is a schematic cross-sectional view of a light source member and a wavelength conversion member according to an embodiment.

Referring to FIG. 14, the embodiment is different from the embodiment of FIG. 5 in that a lower surface of a second substrate 210 of a wavelength conversion member 200_1 according to the embodiment may be partially exposed without being completely covered by a capping layer 230_1.

For example, the capping layer 230_1 may completely cover the side surfaces and the lower surface of the wavelength conversion pattern 220. The capping layer 230_1 may extend outwardly from both sides of the wavelength conversion pattern 220 and cover a portion of the lower surface of the second substrate 210 exposed by the wavelength conversion pattern 220, but may expose at least a portion of the lower surface of the second substrate 210. Capping layers 230_1 corresponding to respective wavelength conversion patterns 220 may cover wavelength conversion patterns 220 spaced apart from one another.

The upper surface of the wavelength conversion pattern 220 may be sealed by the second substrate 210 and the lower surface and both side surfaces of the wavelength conversion pattern 220 may be sealed by the capping layer 230_1 to prevent deterioration of the wavelength conversion pattern 220 and block the penetration of moisture/oxygen. The wavelength conversion member 200_1 of the embodiment may effectively prevent damage to the wavelength conversion pattern 220 even though the capping layer 230_1 may not be disposed in a portion of the second substrate 210, whereby the material cost of the capping layer 230_1 may be reduced.

Figure 15:
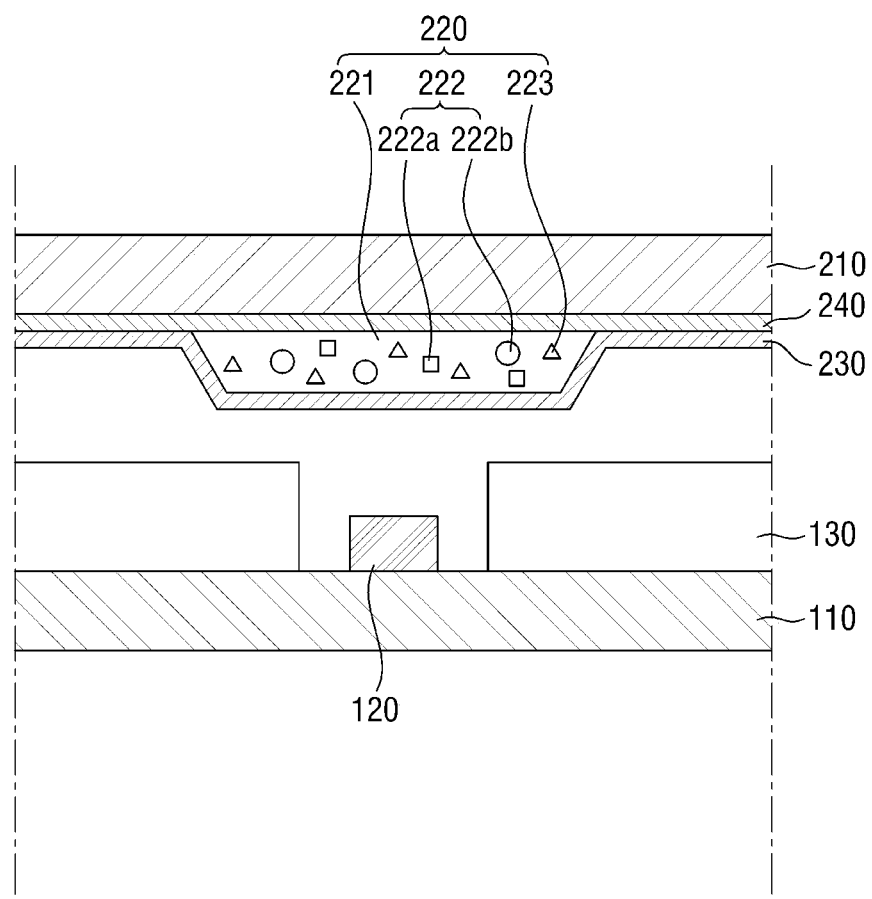
FIG. 15 is schematic cross-sectional view of a light source member and a wavelength conversion member according to an embodiment.
Figure 15:
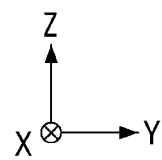

FIG. 15 is a schematic cross-sectional view of a light source member and a wavelength conversion member according to an embodiment.

Referring to FIG. 15, the embodiment is different from the embodiment of FIG. 5 in that a wavelength conversion member 200_2 further includes a barrier layer 240 on the lower surface of the second substrate 210.

The barrier layer 240 may prevent penetration of moisture/oxygen. The barrier layer 240 may include an inorganic material. For example, the barrier layer 240 may include silicon nitride, aluminum nitride, or the like, or a metal thin film having a light transmittance secured. The barrier layer 240 may be formed of the same or similar material as the capping layer 230. However, the disclosure is not limited thereto.

For example, the barrier layer 240 may contact the lower surface of the second substrate 210 and may be disposed entirely on the surface to completely cover the lower surface of the second substrate 210. The wavelength conversion pattern 220 may be disposed on the lower surface of the barrier layer 240. The capping layer 230 may completely cover the lower surface and the side surfaces of the wavelength conversion pattern 220. The capping layer 230 may cover the lower surface of the barrier layer 240 exposed by the wavelength conversion pattern 220.

In the embodiment, the capping layer 230 may be disposed on the entire surface of the barrier layer 240 exposed by the wavelength conversion pattern 220, whereby a single, integrated capping layer 230 may cover the wavelength conversion patterns 220 spaced apart from one another. However, without being limited thereto, the capping layer 230 may expose a portion of the barrier layer 240, similar to the point that the capping layer 230_1 in the embodiment of FIG. 14 exposes a portion of the second substrate 210.

In the embodiment, even when the second substrate 210 may be formed of an organic material, the barrier layer 240 may be disposed on the upper surface of the wavelength conversion pattern 220 and the capping layer 230 may cover the lower surface and the side surfaces of the wavelength conversion pattern 220, whereby the wavelength conversion pattern 220 may be prevented from being damaged from moisture/oxygen by maintaining the sealing structure.

Figure 16:
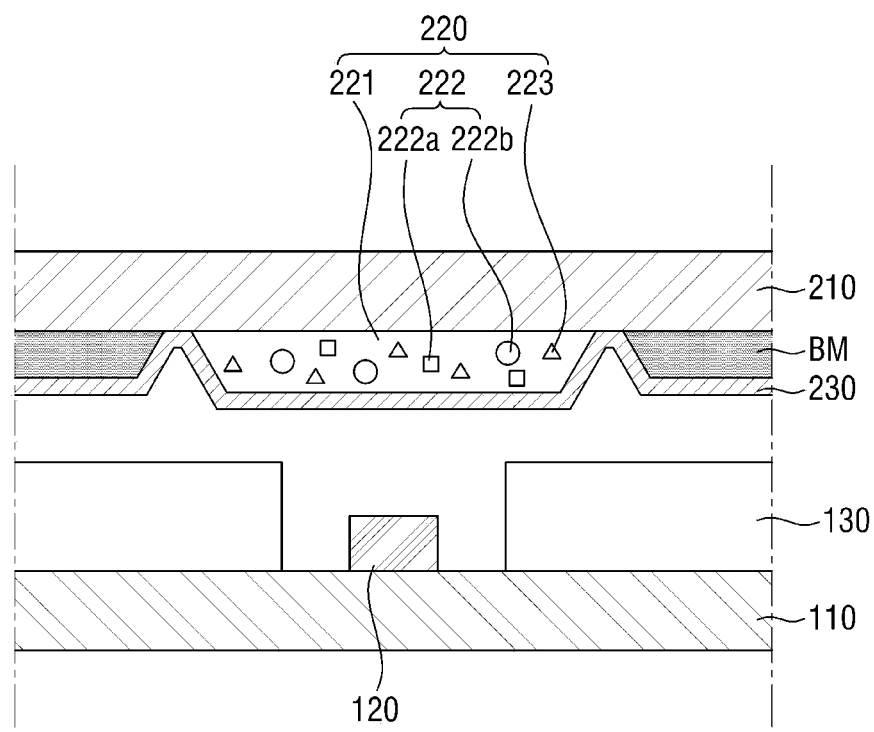
FIG. 16 is a schematic cross-sectional view of a light source member and a wavelength conversion member according to an embodiment.
Figure 16:
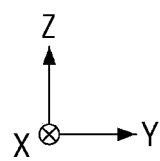
Figure 17:
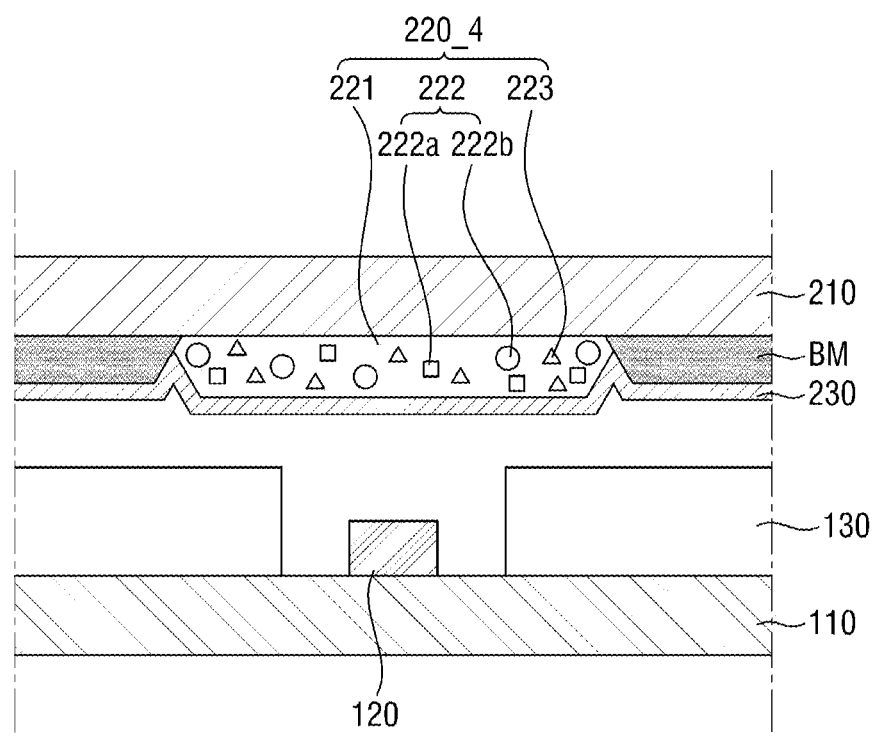
FIG. 17 is a schematic cross-sectional view of a light source member and a wavelength conversion member according to an embodiment.
Figure 18:
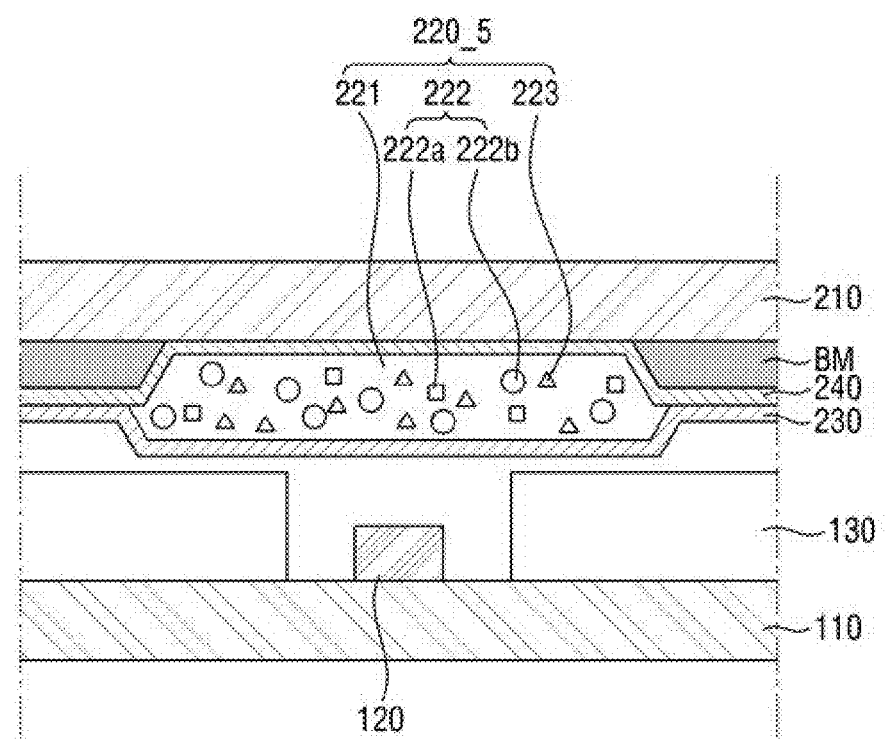
FIG. 18 is schematic cross-sectional view of a light source member and a wavelength conversion member according to an embodiment.

FIG. 16 through FIG. 18 are each schematic cross-sectional views of a light source member and a wavelength conversion member according to embodiments. The embodiments of FIG. 16 through FIG. 18 illustrate that the wavelength conversion member 200 may further include a light blocking member BM.

Referring to FIG. 16 through FIG. 18, the light blocking member BM may be disposed on the lower surface of the second substrate 210. The light blocking member BM may be disposed over the reflective barrier 130 to overlap a portion of the reflective barrier 130 in the thickness direction.

The light blocking member BM may absorb light in such a manner that light emitted from the light source 120 and traveling to the space between the wavelength conversion pattern 220 and the reflective barrier 130 may not be incident on another wavelength conversion pattern (not shown) disposed to correspond to another light source (not shown), whereby the transmission of the light may be blocked.

In some embodiments, the light blocking member BM may include an upper surface, a lower surface, and at least a side surface. The upper surface of the light blocking member BM may be placed on the second substrate 210. The lower surface of the light blocking member BM may be opposed to the upper surface of the light blocking member BM. Each of the upper surface and the lower surface of the light blocking member BM may be located on one plane, and the plane on which the upper surface may be located and the plane on which the lower surface may be located may be substantially parallel to each other and may have a uniform overall thickness. The plane on which a side surface of the light blocking member BM may be located may be inclined at a predetermined angle with respect to the plane on which the upper surface of the light blocking member BM may be located.

The light blocking member BM may be formed of an organic material or a metallic material including chromium. For example, the light blocking member may be a carbon black or an organic black matrix, but is not limited thereto.

Referring to FIG. 16, the embodiment is different from the embodiment of FIG. 5 in that the light blocking member BM may be disposed on the lower surface of the second substrate 210 exposed by the wavelength conversion pattern 220 to be spaced apart from the wavelength conversion pattern 220.

For example, in this embodiment, a wavelength conversion member 200_3 may include the second substrate 210, the wavelength conversion pattern 220 disposed on one surface of the second substrate 210, and a light blocking member BM and a capping layer 230 disposed on one surface of the second substrate 210.

The wavelength conversion pattern 220 may be disposed on the second substrate 210 to be spaced apart from the light blocking member BM. The upper surface of the wavelength conversion pattern 220 may be disposed on the entirety or a portion of one surface of the second substrate 210 exposed by the light blocking member BM spaced apart from the wavelength conversion pattern 220. Therefore, a portion of one surface of the second substrate 210 may be exposed by the wavelength conversion pattern 220 and the light blocking member BM.

The capping layer 230 may be formed on the lower surface and at least a side surface of the light blocking member BM, the lower surface and the at least a side surface of the wavelength conversion pattern 220, and one surface of the second substrate 210 exposed by the light blocking member BM and the wavelength conversion pattern 220.

Referring to FIG. 17, the embodiment is different from the embodiment of FIG. 16 in that a portion of the side surface of the light blocking member BM overlaps a portion of a wavelength conversion pattern 220_4.

For example, the wavelength conversion pattern 220_4 may be entirely disposed to completely cover one surface of the second substrate 210 exposed by the light blocking member BM spaced apart from the wavelength conversion pattern 220_4. The side surface extending from the upper surface of the wavelength conversion pattern 220_4 may be disposed in direct contact with the portion of the side surface of the light blocking member BM.

The capping layer 230 may be disposed on the portion of the side surface of the light blocking member BM exposed by the lower surface of the light blocking member BM and the wavelength conversion pattern 220_4 and extends to the side surface and the lower surface of the wavelength conversion pattern 220_4 to completely cover the surfaces.

Referring to FIG. 18, the embodiment is different from the embodiments of FIGS. 16 and 17 in that the wavelength conversion pattern 220_5 overlaps all of the side surfaces and the lower surface of the light blocking member BM, and the barrier layer 240 is included in the embodiment.

The barrier layer 240 may be disposed on the lower surface and at least a side surface of the light blocking member BM. The barrier layer 240 may extend outwardly from at least a side surface of the light blocking member BM and completely cover the exposed bottom surface of the second substrate 210.

The wavelength conversion pattern 220_5 may be disposed on one surface of the barrier layer 240 in a space between the adjacent light blocking members BM. The wavelength conversion pattern 220_5 may be disposed to overlap the entirety of the side surface of the light blocking member BM and overlap an edge of the lower surface of the light blocking member BM.

The capping layer 240 may be disposed on the lower surface and the side surface of the wavelength conversion pattern 220_5 to completely cover the wavelength conversion pattern 220_5 and may extend outwardly and be disposed on one surface of the barrier layer 240.

The embodiments of 17 and 18 are different from the embodiment of FIG. 16 in that wavelength conversion patterns 220_4 and 220_5 and the light blocking member BM may be partially overlapped. In the embodiments of FIGS. 17 and 18, after the light blocking member BM is disposed on one surface of the second substrate 210, each of the wavelength conversion patterns 220_4 and 220_5 may be disposed in a space between the adjacent light blocking members BM. When light emitted from the light source 120 and incident on the wavelength conversion patterns 220_4 or 220_5 is emitted through the upper surface or side surfaces of the wavelength conversion patterns 220_4 or 220_5, the emitted light may be blocked from travelling to another adjacent wavelength conversion pattern (not shown).

Figure 19:
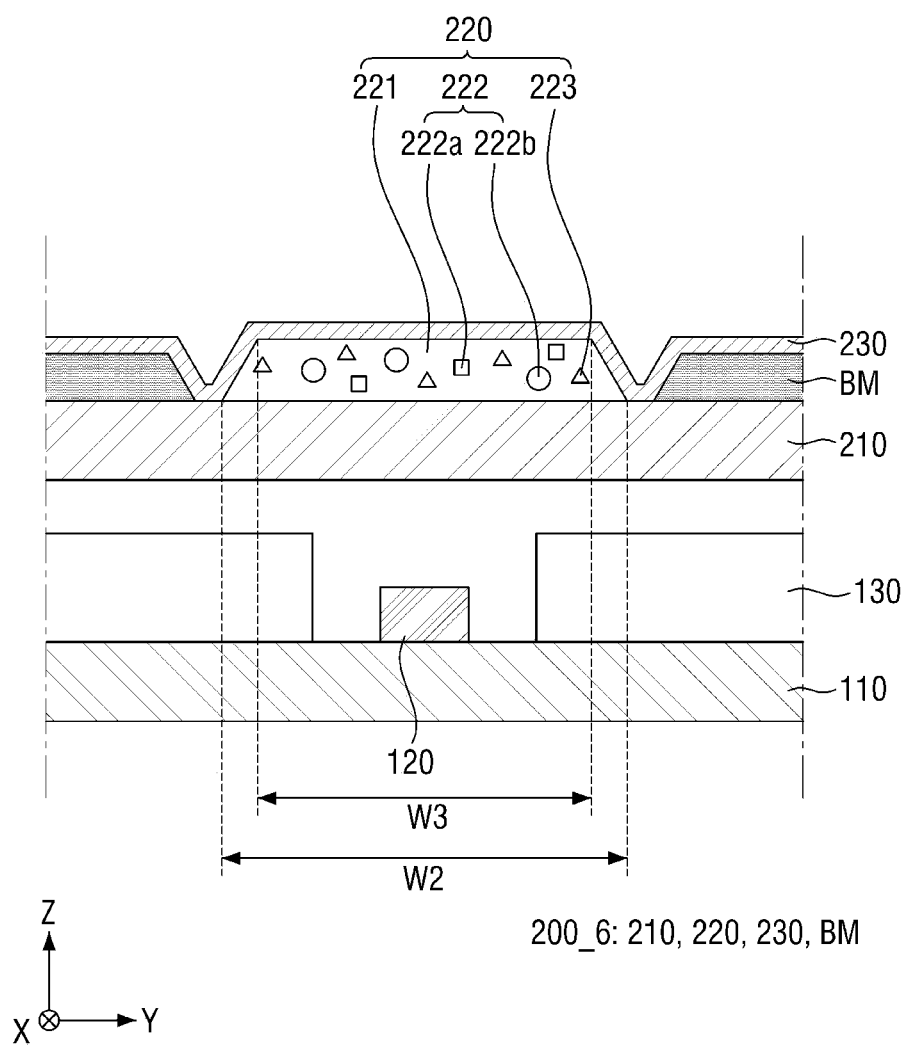
FIG. 19 is schematic cross-sectional view of a light source member and a wavelength conversion member according to an embodiment.
Figure 20:
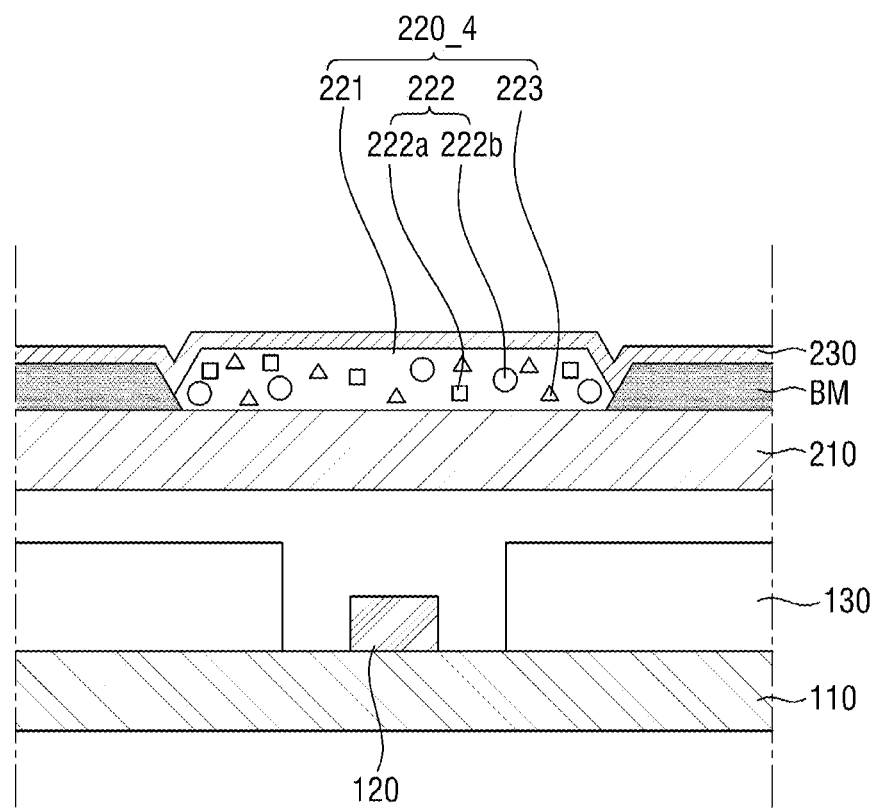
FIG. 20 is a schematic cross-sectional view of a light source member and a wavelength conversion member according to an embodiment.
Figure 20:
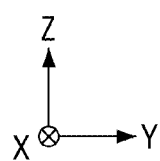
Figure 21:
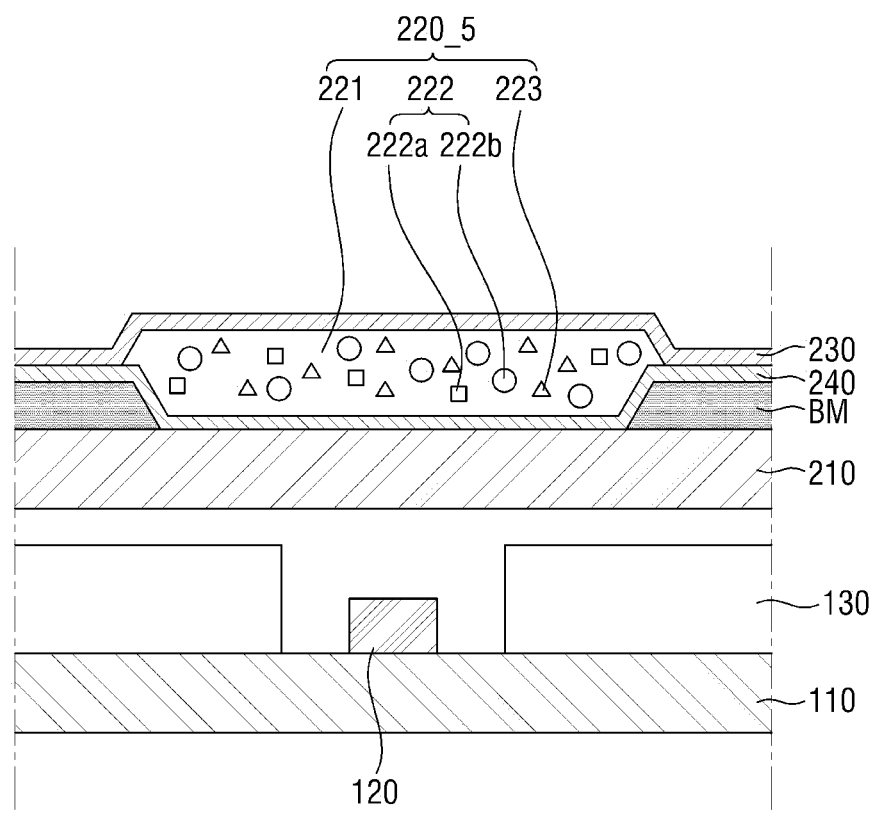
FIG. 21 is a schematic cross-sectional view of a light source member and a wavelength conversion member according to an embodiment.

FIG. 19 through FIG. 21 are each schematic cross-sectional views of a light source member and a wavelength conversion member according to an embodiment. The embodiments of FIG. 19 through FIG. 21 illustrate that the wavelength conversion pattern 220 may be disposed on the upper surface of the second substrate 210.

Referring to FIG. 19, the embodiment is different from the embodiment of FIG. 16 in that the wavelength conversion pattern 220, the light blocking member BM and the capping layer 230 of a wavelength conversion member 200_6 may be disposed on the upper surface of the second substrate 210.

For example, the lower surface of the wavelength conversion pattern 220 and the lower surface of the light blocking member BM may be disposed on the upper surface of the second substrate 210. A width W2 of the lower surface of the wavelength conversion pattern 220 may be greater than a width W3 of the upper surface of the wavelength conversion pattern 220. Such a structure may be formed when the other surface of the second substrate 210 on which the wavelength conversion pattern 220 and the light blocking member BM are not disposed may be disposed to face the light source member 100, after the wavelength conversion pattern 220 and the light blocking member BM are disposed on one surface of the second substrate 210.

The second substrate 210 may be a glass substrate having light transmittance and a low degree of thermal conductivity as described above. The glass substrate is not deformed easily by heat and has a low degree of thermal conductivity. When the second substrate 210 is used as a glass substrate, heat generated when the second substrate 210 emits light from the light source 120 may be primarily blocked in a lower portion of the wavelength conversion pattern 220. Therefore, the second substrate 210 may also prevent the wavelength conversion pattern 220 from being damaged by heat.

FIG. 20 and FIG. 21 illustrate that the light blocking member BM and the wavelength conversion patterns 220_4 and 220_5 may be arranged to overlap each other, unlike the embodiment of FIG. 19.

In one embodiment, the wavelength conversion pattern 220_4 may be disposed to overlap a portion of the side surface of the light blocking member BM as shown in FIG. 20. For example, the wavelength conversion pattern 220_4 may be disposed in a space between the adjacent light blocking member BM and may completely cover an exposed upper surface of the second substrate 210 and overlaps a portion of the side surface of the light blocking member BM. Therefore, another portion of the side surface of the light blocking member BM may be exposed.

In an embodiment, the wavelength conversion pattern 220_5 may be disposed to completely overlap the side surface of the light blocking member BM as shown in FIG. 21. The wavelength conversion pattern 220_5 may extend outwardly from the side surface of the light blocking member BM and may overlap a portion of the upper surface of the light blocking member BM. For example, the wavelength conversion pattern 220_5 may be disposed in a space of the adjacent light blocking members BM to completely cover the exposed upper surface of the second substrate 210 and to cover the entirety of the side surfaces and a portion of the upper surface of the light blocking member BM.

Figure 23:
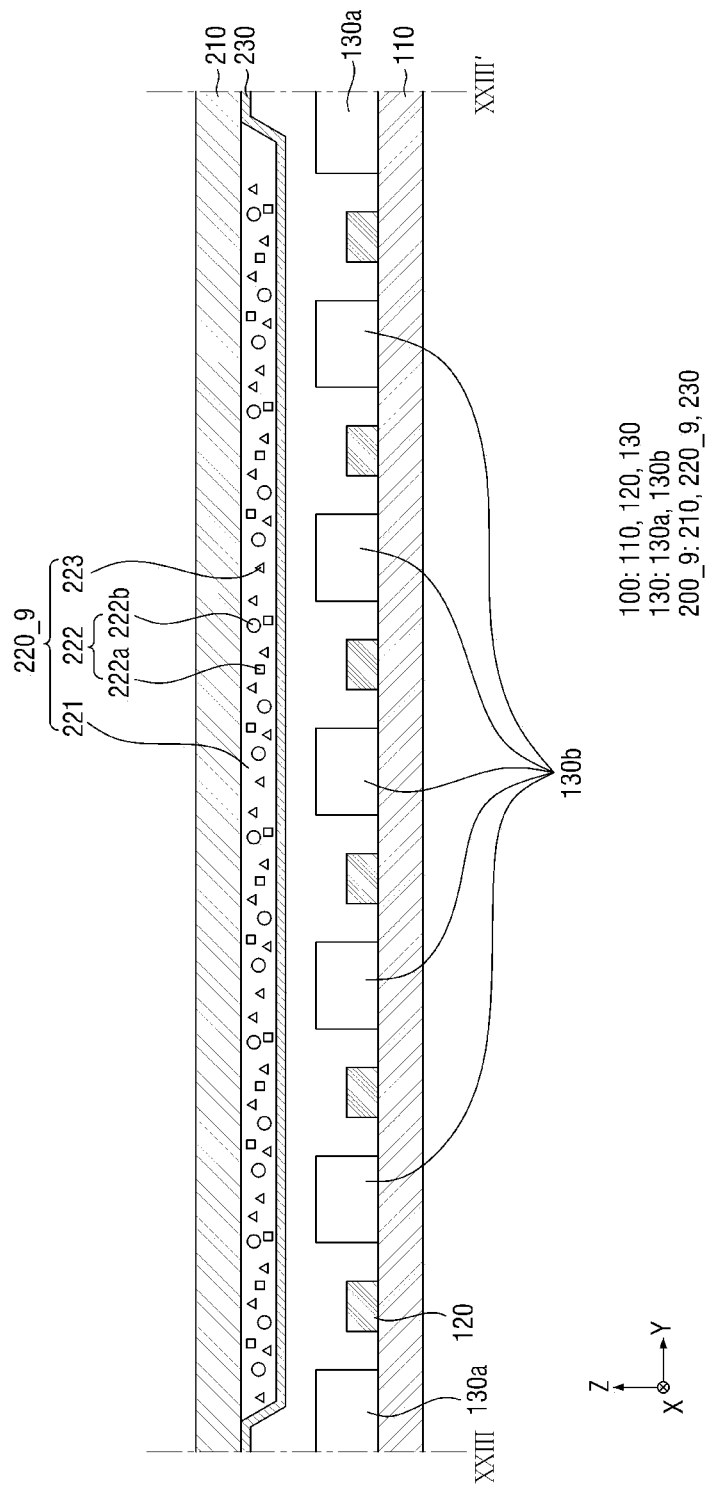
FIG. 23 is a schematic cross-sectional view of a light source member and a wavelength conversion member taken along line XXIII-XXIII' of FIG. 22.

FIG. 22 is a layout view showing a relative positional relationship between a light source of the light source member and a wavelength conversion pattern of the wavelength conversion member according to an embodiment. FIG. 23 is a schematic cross-sectional view of a light source member and a wavelength conversion member taken along line XXIII-XXIII' of FIG. 22.

Referring to FIG. 22 and FIG. 23, the embodiments are different from the embodiment of FIG. 3 in that a wavelength conversion layer 220_9 according to the embodiments may be disposed entirely on the second substrate 210 to include all of the light sources 120 disposed on the first substrate 110.

For example, the wavelength conversion member 200_9 may include a single, integrated wavelength conversion layer 220_9. The wavelength conversion layer 220_9 may be disposed entirely on the surface of the second substrate 210 to include all of the light sources 120 disposed under the wavelength conversion member 200_9. Therefore, the wavelength conversion layer 220_9 may overlap all of the light sources 120 disposed in the light source member 100.

As shown in FIG. 23, the wavelength conversion layer 220_9 may be disposed to overlap all reflective barriers 130b except reflective barriers 130a disposed in an edge of the upper surface of the first substrate 110. A side surface of the wavelength conversion layer 220_9 may overlap a portion of the reflective barrier 130a disposed in the edge of the upper surface of the first substrate 110, in the thickness direction.

In the embodiment, the second substrate 210 may be a glass substrate.

In the embodiment, since the wavelength conversion layer 220_9 may be integrally formed without being patterned for each of the light sources 120, it is difficult to accomplish a reduction in material cost resulting from patterning, but a patterning process may be omitted and may be advantageous in terms of process efficiency. By applying the glass substrate to the second substrate 210, even when the wavelength conversion member 200_9 may be disposed proximal to an upper portion of the light source 120, a phenomenon in which the second substrate 210 is bent or wrinkled may be prevented. When an optical plate 310 disposed over the wavelength conversion member 200_9 may be disposed as a diffusion plate, heat damage to the diffusion plate which is vulnerable to heat may be prevented.

Figure 24:
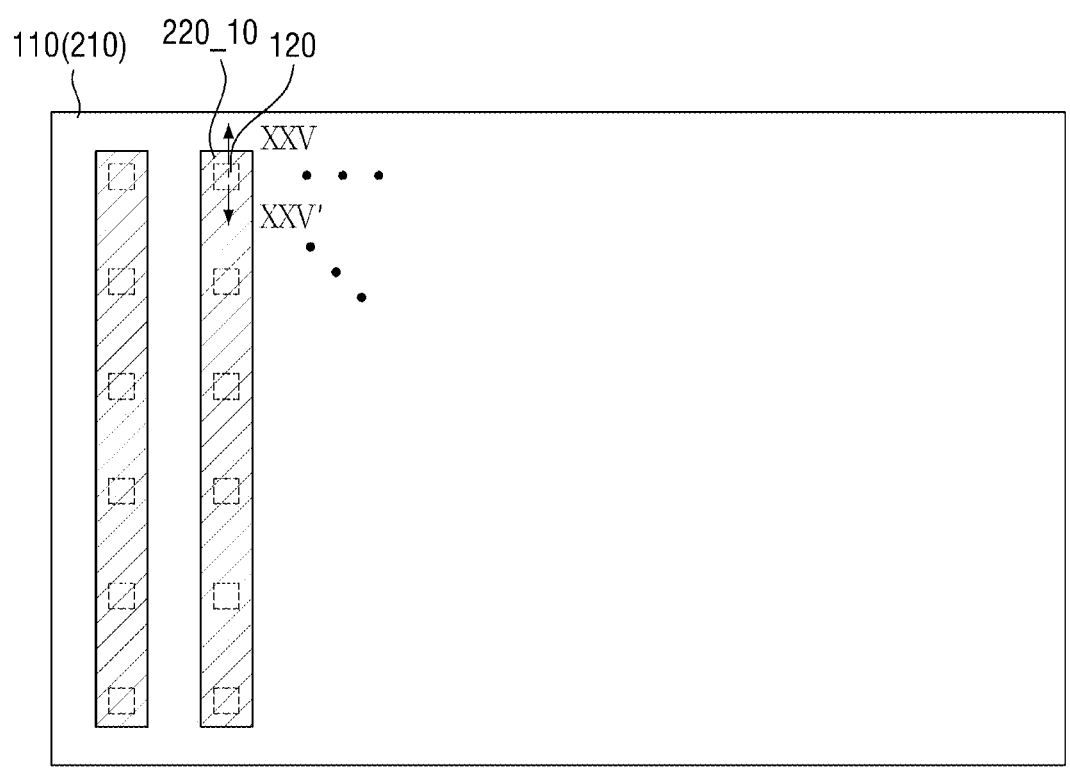
FIG. 24 is a layout view showing a relative positional relationship between a light source of the light source member and a wavelength conversion pattern of the wavelength conversion member according to an embodiment.
Figure 25:
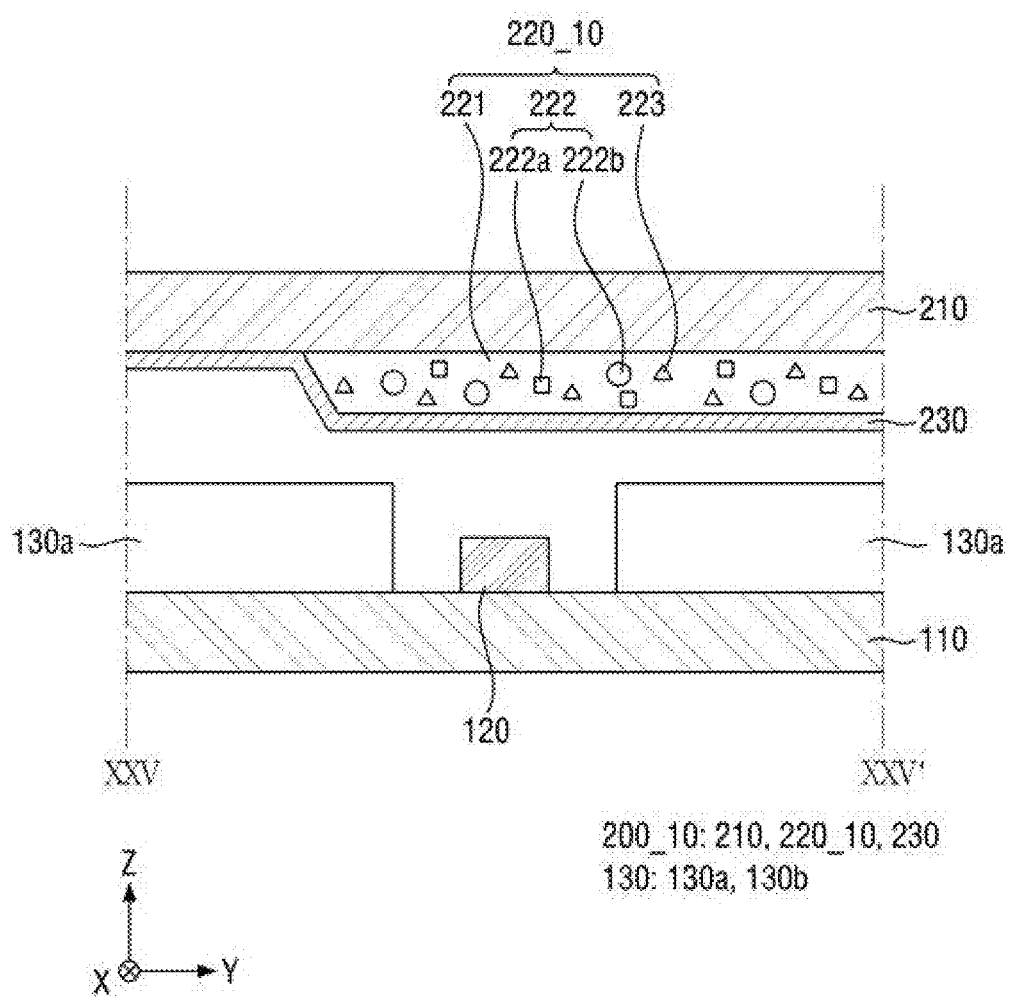
FIG. 25 is a schematic cross-sectional view of the light source member and the wavelength conversion member taken along line XXV-XXV' of FIG. 24.

FIG. 24 is a layout view showing a relative positional relationship between a light source of the light source member and a wavelength conversion pattern of the wavelength conversion member according to an embodiment. FIG. 25 is a schematic cross-sectional view of a light source member and a wavelength conversion member taken along line XXV-XXV' of FIG. 24 where a single light source may be disposed.

Referring to FIG. 24, the embodiment is different from the embodiment of FIG. 3 in that a wavelength conversion pattern 220_10 according to the embodiment has a bar shape in which it may linearly extend in each column and include all of the light sources 120 disposed therein. However, the embodiment may not be limited thereto and the bar shape may be substantially bar shaped or any other suitable shape as may be appreciated and understood by those of ordinary skill in the art.

For example, the wavelength conversion member 200_10 may include bar-shaped wavelength conversion patterns 220_10 that may be spaced apart in a row direction X but extend in a column direction Y. In the embodiment, each wavelength conversion pattern 220_10 may include one light source in the row direction X but may include all of light sources arranged in the column direction Y.

Referring to FIG. 25, a wavelength conversion pattern according to the embodiment is different from the embodiment of FIG. 5 in that a side surface of the wavelength conversion pattern overlaps an upper portion of one of adjacent two reflective barriers surrounding a light source or only an upper portion of one of adjacent two reflective barriers surrounding a light source.

For example, the wavelength conversion pattern 220_10 may include an upper surface and a lower surface, and a single side surface. The side surface of the wavelength conversion pattern 220_10 may overlap the upper portion of the reflective barrier 130a disposed at both ends thereof. Therefore, a portion of the wavelength conversion pattern 220_10 arranged in a direction where it includes no side surface may be disposed so as to overlap the entirety of the reflective barrier 130b disposed therebelow.

Figure 26:
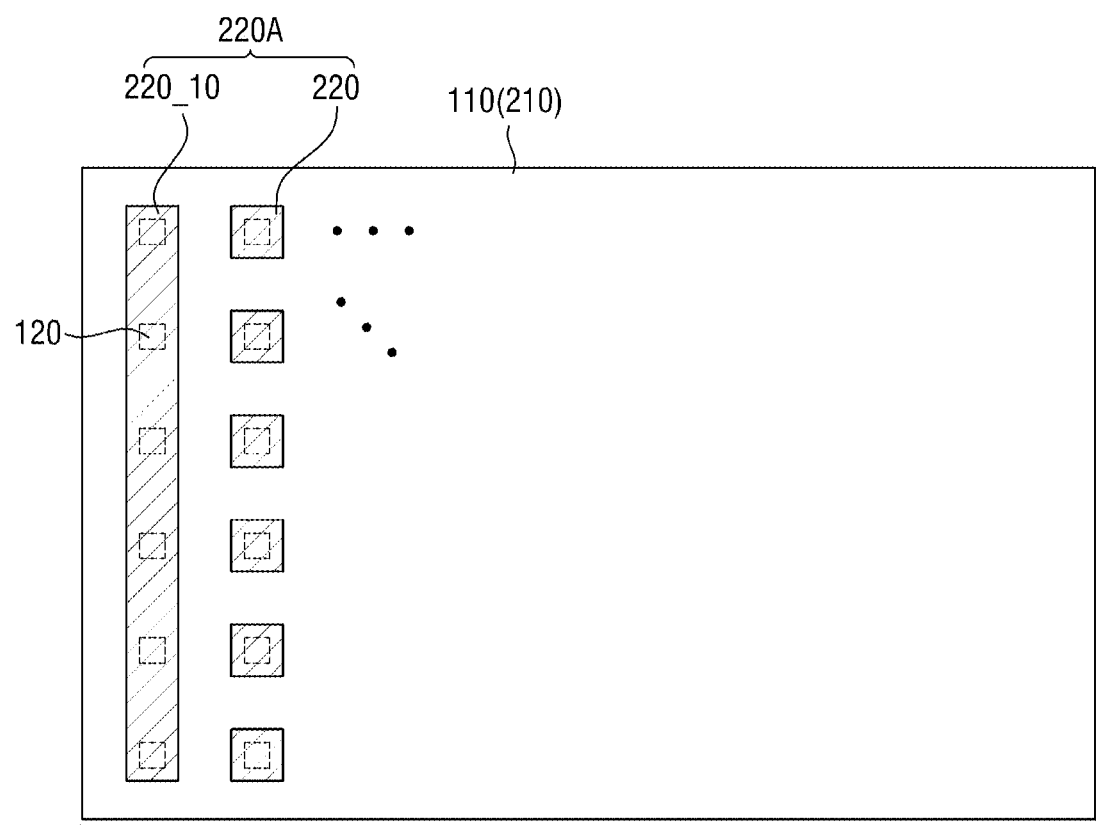
FIG. 26 is a layout view showing a relative positional relationship between a light source of a light source member and a wavelength conversion pattern of a wavelength conversion member according to an embodiment.
Figure 27:
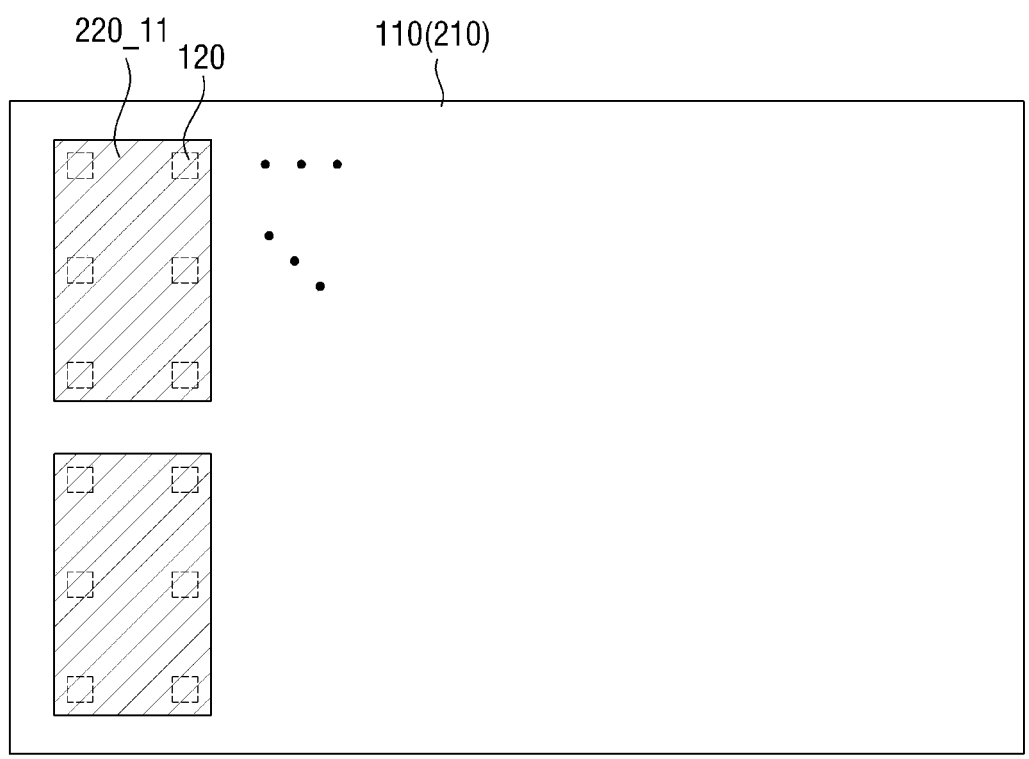
FIG. 27 is a layout view showing a relative positional relationship between a light source of a light source member and a wavelength conversion pattern of a wavelength conversion member according to an embodiment.

FIG. 26 and FIG. 27 are each a layout view showing a relative positional relationship between a light source of a light source member and a wavelength conversion pattern of a wavelength conversion member according to embodiments.

Referring to FIG. 26, a wavelength conversion pattern 220A may have a structure in which different patterns may be arranged in a complex manner.

For example, a bar-shaped wavelength conversion pattern 220_10 including a light sources 120 arranged in a first column may be disposed to overlap the light sources 120 spaced apart from one another in the second direction Y in the first column among the light sources 120 arranged in a matrix form. Respective wavelength conversion patterns 220 may overlap the light sources 120 spaced apart from one another in the second direction Y in the second column among the light sources 120 arranged in a matrix form, so that each wavelength conversion pattern 220 and each light source 120 in the second column are disposed to correspond to each other. For example, the wavelength conversion pattern 220A in the embodiment of FIG. 26 may be a structure in which the wavelength conversion pattern 220 of the embodiment of FIG. 3 and the wavelength conversion pattern 220_10 of the embodiment of FIG. 24 are combined.

Referring to FIG. 27, a wavelength conversion pattern 220_11 may have a structure in which it includes light sources 120 in each of the first direction X and the second direction Y.

For example, on the light sources 120 arranged in a matrix form, a rectangular-shaped wavelength conversion pattern 220_11 may be disposed to overlap and include at least two light sources 120 in the first direction X and at least three light sources 120 in the second direction Y.

A relative positional relationship between the wavelength conversion patterns 220A and 220_11 according to the arrangement of the light sources 120 shown in FIGS. 26 and 27 is merely provided by way of example, and the arrangement of the light sources 120 and the structure of the wavelength conversion pattern 220 may be varied in various manners.

Figure 28:
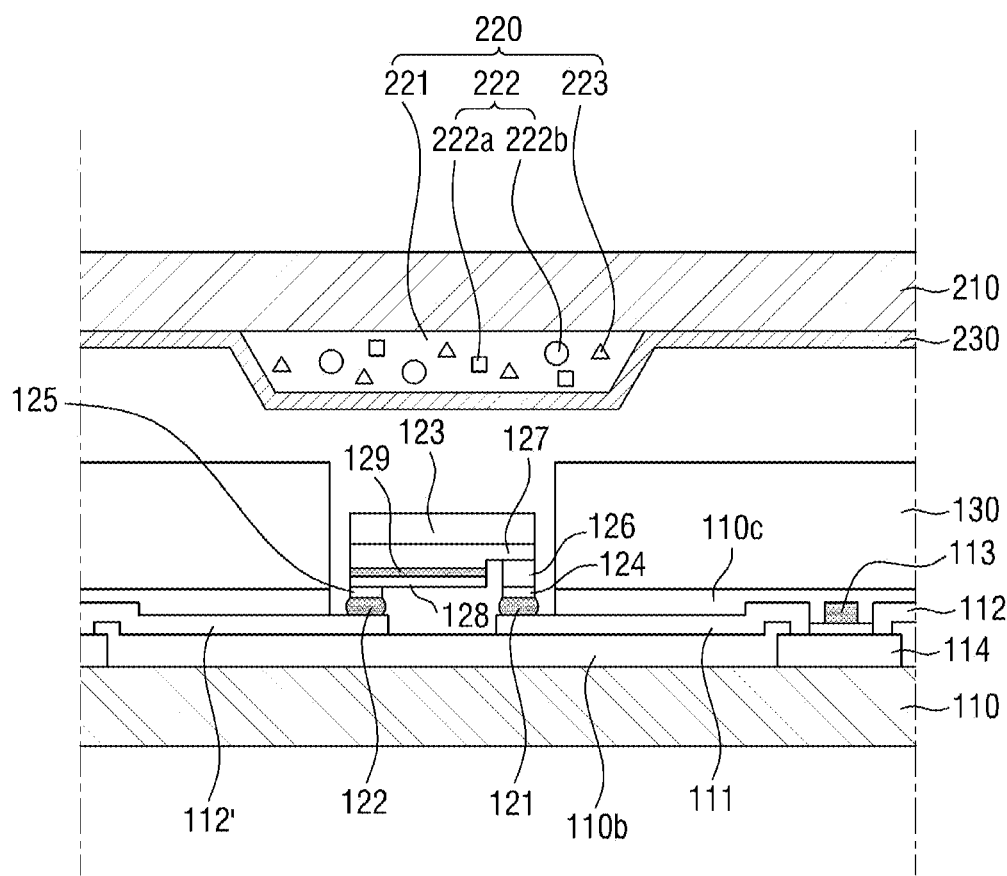
FIG. 28 is a schematic cross-sectional view of a light source member and a wavelength conversion member according to an embodiment.
Figure 28:
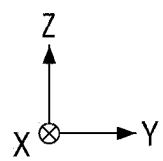

FIG. 28 is a schematic cross-sectional views of a light source member and a wavelength conversion member according to an embodiment. The embodiment of FIG. 28 illustrates that the light source member 100 may include a circuit element layer 110A.

For example, the circuit element layer 110A may include a transistor 110a and insulating layers 110b and 110c. The transistor 110a may include a source electrode 111, a drain electrode 112, a gate electrode 113, and an active layer 114. The insulating layers 110b and 110c may include a first insulating layer 110b and a second insulating layer 110c.

The active layer 114 of the transistor 110a may be disposed on the upper surface of the first substrate 110. Although it is not illustrated in the drawings, the circuit element layer 110A may further include a buffer layer disposed between the active layer 114 of the transistor 110a and the first substrate 110. Accordingly, the active layer 114 may be disposed on the buffer layer. The active layer 114 may be a semiconductor layer including an oxide semiconductor, silicon, or the like, but is not limited thereto.

Although not shown in the drawings, the active layer 114 may include a conductive region and a channel region. A region where the gate electrode 113 and the active layer 114 overlap each other (to be described below) is a channel region, and besides the channel region, the other region may be a conductive region partially doped with impurities. The source electrode 111 and the drain electrode 112 may be in contact with the conductive region.

The active layer 114 may be disposed on the first insulating layer 110b. The source electrode 111, the drain electrode 112, and the gate electrode 113 may be disposed on the first insulating layer 110b. The active layer 114 may overlap the gate electrode 113 with the first insulating layer 110b interposed therebetween to form the channel region described above. The first insulating layer 110b may be disposed entirely on the upper surface of the first substrate 110.

A contact hole may be formed in the first insulating layer 110b to expose a portion of the active layer 114 through the first insulating layer 110b. The source electrode 111 and the drain electrode 112 disposed on the first insulating layer 110b may contact the conductive region of the active layer 114 through the contact hole. The source electrode 111 and the drain electrode 112 may extend in one direction to a region where the light source 120 may be disposed. The source electrode 111 and the drain electrode 112 may contact conductive balls 121 and 122 of the light source 120 (to be described later) to transmit an electrical signal to the light source 120. Planar areas in which the source electrode 111 and the drain electrode 112 are in contact with the conductive balls 121 and 122 of the light source 120 may have extended shapes. For example, a region of the transistor 110A connected to the active layer 114 may have a linear shape with a relatively narrow width, and regions of the transistor 110A in contact with the conductive balls 121 and 122 may be expanded in the width or area thereof and thus, may have shapes such as circular shapes, square shapes or the like. However, the disclosure may not be limited thereto. A region of the transistor 110A connected to the active layer 114 may have any other suitable shape as may be appreciated and understood by those of ordinary skill in the art The source electrode 111 and the drain electrode 112 may extend in one direction and may be terminated so as to be spaced apart from a source electrode and a drain electrode 112' of another transistor 110a. The light source 120 may be disposed in a region where the source electrode 111 and the drain electrode 112' are spaced apart from each other and are terminated, and light emitted from the light source 120 may proceed to the spaced region.

The second insulating layer 110c may be disposed on lower surfaces of the gate electrode 113, the source electrode 111 and the drain electrode 112. The second insulating layer 110c may be formed entirely on the first substrate 110 such as the first insulating layer 110b, but may be disposed to expose some regions of the first insulating layer 110b and the source electrode 111 and the drain electrode 112. The second insulating layer 110c may cover the source electrode 111 and the drain electrode 112 to insulate the electrodes from each other and expose a region electrically connected to the light source 120.

The light source 120 may be disposed on the circuit element layer 110A and may be connected to the source electrode and the drain electrode 112 of the transistor. Each light source 120 may be connected to a different transistor 110a and may be connected to the source electrode 111 and the drain electrode 112 of each transistor 110a. In other words, one transistor 110a may be connected to two different light sources 120. However, the number of the light sources 120 connected to one transistor 110a may be varied depending on the number of the light sources 120 disposed on the first substrate 110, but is not limited thereto.

The light source 120 may be disposed on the circuit element layer 110A and connected to the source electrode 111 and the drain electrode 112 of the transistor 110a. The light source 120 may emit light of a specific wavelength band when an electrical signal is applied thereto from the transistor 110a.

As shown in FIG. 28, the light source 120 includes a base substrate 123, a first conductivity type semiconductor 127, a second conductivity type semiconductor 128, an active material layer 129, electrode layers 124 and 125 and conductive balls 121, 122. An electrical signal transmitted from the transistor 110a may be transmitted to the active material layer 129 through the first conductivity type semiconductor 127 and the second conductivity type semiconductor 128, and the active material layer 129 may transmit light of a specific wavelength band.

For example, the base substrate 123 may be disposed on an upper portion of a semiconductor crystal of the light source 120. In an embodiment, the base substrate 123 may include a sapphire substrate ($Al_2O_3$) and a transparent substrate such as glass. However, the disclosure may not be limited thereto, and may be made of a conductive substrate such as GaN, SiC, ZnO, Si, GaP, GaAs or the like.

The first conductivity type semiconductor 127 may be disposed on a lower surface of the base substrate 123. The first conductivity type semiconductor 127 may be an n-type semiconductor layer. For example, when the light source 120 emits light in a blue wavelength band, the first conductivity type semiconductor 127 may be formed of a semiconductor material having the chemical formula of $In_xAl_yGa_{1-x-y}N$ ($0 \leq x \leq 1$, $0 \leq y \leq 1$, $0 \leq x+y \leq 1$). For example, the first conductivity type semiconductor 127 may be at least one of n-type doped InAlGaN, GaN, AlGaN, InGaN, AlN and InN. The first conductivity type semiconductor 127 may be doped with a first conductive dopant and an example of the first conductive dopant may be Si, Ge, Sn, or the like.

At least a portion of a lower surface of the first conductivity type semiconductor 127 may be recessed inwardly. An auxiliary layer 126 may be disposed on the recessed portion of the lower surface of the substrate. A first electrode layer 124 to be described later may be disposed on a lower surface of the auxiliary layer 126. The auxiliary layer 126 may function to compensate a stepped portion between the first electrode layer 124 and the second electrode layer 125 disposed on the lower surface of the second conductivity type semiconductor 128. The auxiliary layer 126 may include an electrically conductive material or a semiconductor material to transmit an electrical signal applied to the first electrode layer 124 to the first conductivity type semiconductor 127.

The second conductivity type semiconductor 128 may be a p-type semiconductor layer. For example, when the light source 120 emits blue light, the second conductivity type semiconductor 128 may be a semiconductor material having the chemical formula of $In_xAl_yGa_{1-x-y}N$ ($0 \leq x \leq 1$, $0 \leq y \leq 1$, $0 \leq x+y \leq 1$). For example, the second conductivity type semiconductor 128 may be at least one of p-type doped InAlGaN, GaN, AlGaN, InGaN, AlN and InN. The second conductivity type semiconductor 128 may be doped with a second conductive dopant. For example, an example of the second conductive dopant may be Mg, Zn, Ca, Se, Ba, or the like.

The active material layer 129 may be disposed between the first conductivity type semiconductor 127 and the second conductivity type semiconductor 128. The active material layer 129 may include a material having a single or multiple quantum well structure. When the active material layer 129 includes a material having a multiple quantum well structure, such a structure may be formed such that quantum layers and well layers may be alternately stacked. The active material layer 129 may emit light by combining electron-hole pairs according to an electrical signal applied through the first conductivity type semiconductor 127 and the second conductivity type semiconductor 128. For example, when the active material layer 129 emits blue light, it may include a material such as AlGaN, AlInGaN, and the like. For example, when the active material layer 129 may have a multiple quantum well structure where quantum layers and well layers may be alternately stacked, the quantum layers may include AlGaN or AlInGaN and the well layers may include a material such as GaN or AlGaN, or the like. However, the disclosure may not be limited thereto, and the active material layer 129 may include other Group III to Group V semiconductor materials depending on a wavelength band of emitted light.

The electrode layers 124 and 125 may be disposed on the lower surfaces of the auxiliary layer 126 and the second conductivity type semiconductor 128, respectively. The first electrode layer 124 may be disposed on the lower surface of the auxiliary layer 126 and the second electrode layer 125 may be disposed on the lower surface of the second conductivity type semiconductor 128. The conductive balls 121 and 122 such as the first conductive ball 121 and the second conductive ball 122 may be disposed on the lower surfaces of the first electrode layer 124 and the second electrode layer 125, respectively. The electrode layers 124 and 125 and the conductive balls 121 and 122 may include an electrically conductive material and may transfer an electrical signal transmitted from the transistor 110a to the first conductivity type semiconductor 127 and the second conductivity type semiconductor 128. The light source 120 may be electrically connected to the source electrode 111 and the drain electrode 112 of the transistor 110a through the conductive balls 121 and 122. However, the structure of the light source 120 is not limited thereto and may be varied depending on cases.

While the invention has been illustrated and described with reference to the embodiments thereof, it will be apparent to those of ordinary skill in the art that various changes in form and detail may be formed thereto without departing from the spirit and scope of the invention.

What is claimed is:

1. A backlight unit comprising:
a light source member including:
a first substrate;
a plurality of light sources disposed on a surface of the first substrate; and
at least one reflective barrier; and
a wavelength conversion member disposed over the light source member to overlap the light source member, the wavelength conversion member including a second substrate and a plurality of wavelength conversion patterns disposed on a surface of the second substrate,
wherein the plurality of wavelength conversion patterns are disposed to be spaced apart from one another, and each of the plurality of wavelength conversion patterns covers at least one of the plurality of light sources and partially covers the at least one reflective barrier.

2. The backlight unit of claim 1, wherein the plurality of wavelength conversion patterns includes a binder layer and wavelength conversion particles and scattering particles are dispersed in the binder layer.

3. The backlight unit of claim 1, wherein the plurality of light sources are disposed to be spaced apart from one another and the at least one reflective barrier is disposed on the surface of the first substrate on which the respective plurality of light sources are exposed.

4. The backlight unit of claim 3, wherein a width of a lower surface of at least one of the plurality of wavelength conversion patterns is greater than a distance between reflective barriers to completely cover a space between the reflective barriers.

5. The backlight unit of claim 3, wherein the plurality of light sources and the at least one reflective barrier do not overlap each other in a thickness direction.

6. The backlight unit of claim 5, wherein the plurality of light sources and side surfaces of the at least one reflective barrier adjacent to the plurality of light sources are spaced apart from each other.

7. The backlight unit of claim 6, wherein the wavelength conversion patterns at least partially overlap the at least one reflective barrier.

8. The backlight unit of claim 3, wherein the at least one reflective barrier includes a barrier portion and a reflective coating layer disposed on the barrier portion.

9. The backlight unit of claim 8, wherein the reflective coating layer includes a first reflective coating layer disposed on an upper surface of the barrier portion.

10. The backlight unit of claim 9, wherein the reflective coating layer further includes a second reflective coating layer disposed on a side surface of the barrier portion.

11. The backlight unit of claim 3, wherein the light source member further includes a protective resin covering an upper surface and at least a side surface of each of the plurality of light sources.

12. The backlight unit of claim 11, wherein each of the plurality of light sources and a side surface of the at least one reflective barrier adjacent to the plurality of light sources are spaced apart from each other, and the protective resin fills a space between each of the plurality of light sources and the side surface of the at least one reflective barrier adjacent to each of the plurality of light sources.

13. The backlight unit of claim 1, wherein the wavelength conversion member further includes a capping layer covering the plurality of wavelength conversion patterns.

14. The backlight unit of claim 1, wherein the second substrate includes glass.

15. The backlight unit of claim 1, wherein the surface of the first substrate and the surface of the second substrate face each other.

16. A backlight unit comprising:
a light source member including:
a first substrate;
a plurality of light sources disposed on a surface of the first substrate; and
reflective barriers; and
a wavelength conversion member disposed to overlap the light source member and the wavelength conversion member including a second substrate containing glass; and
a wavelength conversion layer disposed on a surface of the second substrate, a side surface of the wavelength conversion layer overlapping a portion of a reflective barrier disposed in an edge of a surface of the first substrate,
wherein the plurality of light sources and the reflective barriers do not overlap in a thickness direction.

17. The backlight unit of claim 16, wherein the wavelength conversion member further includes a capping layer covering the wavelength conversion layer.

18. The backlight unit of claim 17, wherein the plurality of light sources are disposed to be spaced apart from each other.

19. A display device comprising:
a backlight unit comprising a light source member including a first substrate; and a plurality of light sources disposed on a surface of the first substrate and a wavelength conversion member disposed to overlap the light source member and the wavelength conversion member including a second substrate and a plurality of wavelength conversion patterns disposed on a surface of the second substrate; and
a display panel disposed over the backlight unit,
wherein the plurality of wavelength conversion patterns are disposed to be spaced apart from one another, and each of the wavelength conversion patterns covers at least one of the plurality of light sources and partially covers a reflective barrier.

20. The display device of claim 19, wherein the light source member includes the reflective barrier, the plurality of light sources are disposed to be spaced apart from one another, the reflective barrier is disposed on the surface of the first substrate on which the respective light sources are exposed, the wavelength conversion member further includes a capping layer covering the plurality of wavelength conversion patterns, and the second substrate includes glass.

21. The display device of claim 19, wherein the backlight unit further includes a diffusion plate disposed on an upper portion of the wavelength conversion member, and at least one optical sheet disposed on an upper portion of the diffusion plate.

22. The display device of claim 21, wherein the at least one optical sheet includes a prism sheet and a reflective polarizing sheet sequentially stacked in an upward direction.

* * * * *